US006518345B2

(12) United States Patent
Tanaka et al.

(10) Patent No.: US 6,518,345 B2
(45) Date of Patent: Feb. 11, 2003

(54) FIRE EXTINGUISHING COMPOSITION

(75) Inventors: Kazunori Tanaka, Izumi (JP); Kenji Nagao, Nara (JP); Yutaka Hashimoto, Sakai (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/901,620

(22) Filed: Jul. 11, 2001

(65) Prior Publication Data

US 2002/0014610 A1 Feb. 7, 2002

(51) Int. Cl.[7] .................................................. C08K 5/09
(52) U.S. Cl. ....................................................... 524/321
(58) Field of Search ........................................... 524/321

(56) References Cited

U.S. PATENT DOCUMENTS

| | | | | | |
|---|---|---|---|---|---|
| 3,562,156 | A | | 2/1971 | Francen | 252/8.05 |
| 3,772,195 | A | | 11/1973 | Francen | 252/8.05 |
| 4,149,599 | A | | 4/1979 | Chiesa, Jr. | 169/47 |
| 4,330,365 | A | * | 5/1982 | Tessler | 162/168 |
| 4,402,977 | A | * | 9/1983 | Grollier | 424/70 |
| 4,464,267 | A | | 8/1984 | Chiesa, Jr. et al. | 252/8.05 |
| 4,536,298 | A | | 8/1985 | Kamei et al. | 252/8.05 |
| 4,563,287 | A | | 1/1986 | Hisamoto et al. | 252/2 |
| 5,085,786 | A | | 2/1992 | Alm et al. | 252/8.05 |
| 5,173,521 | A | * | 12/1992 | Ishino | 524/45 |
| 6,133,199 | A | * | 10/2000 | Soula | 504/206 |
| 6,156,222 | A | | 12/2000 | Jennings et al. | 252/8.05 |

FOREIGN PATENT DOCUMENTS

| | | |
|---|---|---|
| EP | 0 524 138 A1 | 1/1993 |
| EP | 0 595 772 A1 | 5/1994 |
| EP | 0 609 827 A1 | 8/1994 |
| ES | 2 040 176 | 10/1993 |
| FR | 2 636 334 | 3/1990 |
| FR | 2 637 506 | 4/1990 |
| GB | 1 280 508 | 7/1972 |
| GB | 1 368 463 | 9/1974 |
| GB | 1 422 438 | 1/1976 |
| GB | 1 566 724 | 5/1980 |
| GB | 2 034 180 A | 6/1980 |
| GB | 2 311 219 A | 9/1997 |
| JP | 59-230566 | 12/1984 |
| JP | 61-100266 | 5/1986 |
| JP | 9-124884 | 5/1997 |
| JP | 2001-79108 | 3/2001 |
| WO | WO 92/15371 | 9/1992 |
| WO | WO 96/05889 | 2/1996 |

OTHER PUBLICATIONS

"Chemical Abtract"—XP 002183659 Abstract.

* cited by examiner

*Primary Examiner*—Edward J. Cain
(74) *Attorney, Agent, or Firm*—Armstrong, Westerman & Hattori, LLP

(57) ABSTRACT

A fire extinguishing composition is provided which, when compared with conventional fire extinguishing compositions, displays superior rapid fire extinguishing performance, flame resistance, fuel resistance and reignition prevention for both non-polar solvent fires and polar solvent fires, and also displays superior stability as a diluted solution. The fire extinguishing composition comprises a cationic polyamine based high molecular weight compound (A) which incorporates primary, secondary, and tertiary cationic groups within each molecule, and the primary cationic groups account for no more than 40% by weight of all the cationic groups.

20 Claims, 1 Drawing Sheet

FIRE EXTINGUISHING COMPOSITION

BACKGROUND OF THE INVENTION

1. Field of the Invention

The present invention relates to a fire extinguishing composition comprising polyethyleneimine or a derivative thereof, and more particularly to a fire extinguishing composition which is superior in terms of rapid extinguishing performance, flame resistance, fuel resistance, and reignition prevention performance.

2. Description of the Background Art

Generally, in the case of fires involving polar solvents such as alcohols, ketones, esters, ethers and amines, even if fire extinguishing is attempted with a typical petroleum fire extinguishing composition, the foam disappears soon after contacting the combustion surface, and the fire is unable to be extinguished. As a result, the following types of compositions have been proposed as polar solvent fire extinguishing compositions:

(1) protein hydrolysates to which a metallic soap has been added, (2) synthetic surfactants to which a metallic soap has been added, (3) protein hydrolysates to which a fluorine based surfactant has been added (a fluorinated protein), and (4) fluorine based surfactants to which a water soluble high molecular weight material has been added to form a thixotropic liquid.

Of these compositions, fire extinguishing compositions of type (4) above are aqueous film forming foam compositions based on a fluorine based surfactant, to which a water soluble high molecular weight material (such as a polysaccharide) has been added to give thixotropic properties. On contact with a polar solvent, foams which consist of this type of composition lose water at the combustion interface, and the remaining water soluble high molecular weight material, incorporating air bubbles, forms a gel-like mat across the solvent surface, preventing direct contact between the upper part of foam and the solvent, and covering the entire combustion surface. It is believed that the fire is then extinguished by cooling and smothering effects. Compared with the fire extinguishing compositions of types (1), (2) and (3) above, compositions of type (4) offer better foam development on the combustion surface, and also offer an improved fire extinguishing effect.

However, assuming the mechanism above, wherein the gel-like mat of the water soluble high molecular weight material protects the foam from the solvent, fire extinguishing compositions of the type (4) above will display poor fire extinguishing effect on solvents such as alcohols (such as isopropyl alcohol and t-butanol) or propylene oxide which have large heats of combustion or are highly volatile, and so depending on the type of solvent, the dilution ratio of the composition concentrate may need to be increased, which makes handling somewhat troublesome. Moreover, because fire extinguishing compositions of the type (4) described above rely on smothering utilizing the covering effect of the gel-like mat, good effects are displayed in so-called soft running methods where the foam is poured gently onto the surface of the fuel along the side wall of a tank such as in a foam chamber, but in methods where the foam is shot directly onto the solvent surface from the foam discharge nozzle of a chemical fire engine or the like, a method which represents the most common fire fighting strategy, the surface of the fuel is disturbed, meaning the gel-like mat can sink and the fuel surface can reappear above the mat and reignite, and consequently problems still remain over the performance of these type (4) compositions in actual fire fighting situations.

Furthermore, these fire extinguishing compositions incorporate large amounts of water soluble high molecular weight material, and so the composition concentrate is extremely viscous (at least 1200 $mm^2/s$), and moreover the viscosity value varies considerably with temperature. Consequently, considerable care needs to be taken with the fire extinguishing equipment (such as mixers and piping), and there are handling concerns associated with the practical application of these types of compositions to existing equipment. Furthermore, conventionally these type of fire extinguishing compositions have been prone to forming a thin membrane (skin) on the surface of the liquid and on the walls of the tank during storage, and moreover producing sedimentation on the bottom of the tank, and problems have also arisen over the life of the product with concerns that they do not cope with extended storage. In addition, these types of fire extinguishing compositions also have a relatively high freezing point of approximately 0° C., and because they are not reversible in terms of freezing and remelting, use or storage of such compositions in cold regions requires special considerations.

An example of a fire extinguishing composition which displays superior fuel resistance, flame resistance (for example, reignition sealing) and heat resistance when compared with conventional compositions was disclosed by the present applicants in Japanese Unexamined Patent Application, First Publication No. Sho-59-230566, and comprises a surfactant with an anionic hydrophilic group and a cationic water soluble high molecular weight compound, mixed with a third constituent comprising a polybasic acid compound of 3 to 24 carbon atoms.

However, although this fire extinguishing composition is able to be used for extinguishing both polar solvent fires and non-polar solvents, the time required to extinguish a fire is relatively long, and the composition could not be claimed to offer rapid fire extinguishing performance. In addition, the composition also has problems in terms of flame resistance, and reignition prevention. Furthermore, in actual fire fighting activity, when the fire extinguishing composition concentrate was diluted with either fresh water or sea water, problems arose in terms of the extended stability of the diluted solution, with cloudiness developing in the diluted solution.

BRIEF SUMMARY OF THE INVENTION

An object of the present invention is to provide a fire extinguishing composition which when compared with conventional fire extinguishing compositions displays superior rapid fire extinguishing performance, flame resistance, fuel resistance and reignition prevention performance, for both non-polar solvent fires and polar solvent fires, as well as displaying superior stability as a diluted solution.

In order to achieve the above object, the present invention is a fire extinguishing composition which comprises a cationic polyamine based high molecular weight compound (A) which has primary, secondary, and tertiary cationic groups within the molecular structure and moreover in which the primary cationic groups account for no more than 40% by weight of the total cationic groups within the molecule.

The fire extinguishing composition of the present invention forms a foam which is extremely stable with respect to polar solvents, and yet also forms an aqueous film on the surface of non-polar solvents such as petroleum, and offers flame resistance and fuel resistance properties which display markedly improved rapid fire extinguishing performance and reignition prevention.

DETAILED DESCRIPTION OF THE INVENTION

Figure 1:
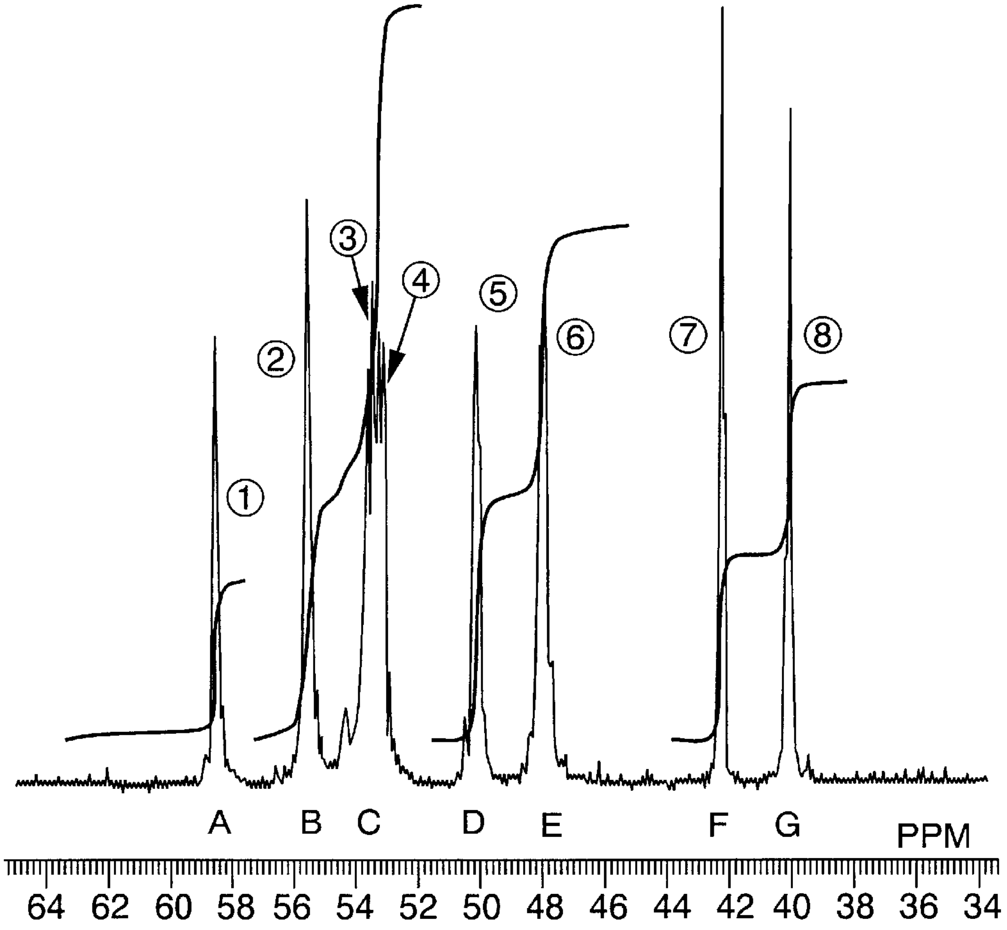
FIG. 1 is a nuclear magnetic resonance spectrum of a polyethyleneimine.
Figure 2:
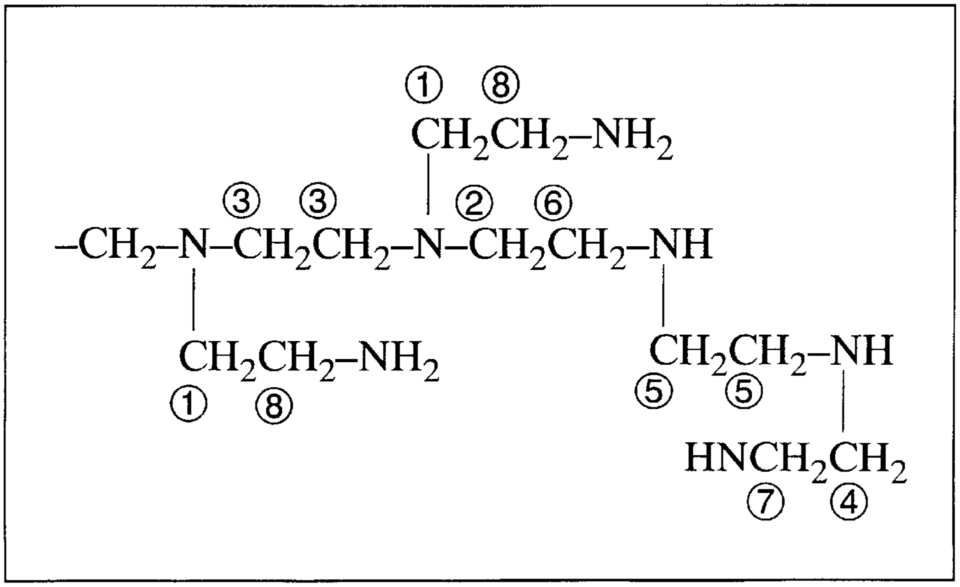
FIG. 2 is a diagram showing the chemical structures corresponding with the peak numbers on the nuclear magnetic resonance spectrum shown in FIG. 1.

The cationic polyamine based high molecular weight compound (A) used in the present invention refers to a high molecular weight compound which incorporates cationic groups such as amino groups, ammonium groups, pyridinium groups or quaternary ammonium groups, and is a water soluble high molecular weight compound with a solubility in conventional water of at least 0.1% by weight.

The cationic groups described above comprise primary, secondary and tertiary groups, and the cationic groups can exist on either the main chain or a side chain of the polyamine based high molecular weight compound.

There are no particular restrictions on the relative proportions of primary, secondary and tertiary cationic groups, although in the present invention, for the reasons outlined below, primary cationic groups must account for no more than 40% by weight of the total cationic groups.

The degree of polymerization of the water soluble high molecular weight compound is regulated by the water solubility of the compound, and from the oligomer region, degrees of polymerization of at least several tens of thousands, namely weight average molecular weights of 1,000 to 1,000,000 are typical, with values of 4,000 to 300,000 being preferred, and degrees of polymerization of 50,000 to 100,000 being the most desirable in terms of producing a composition with the most superior fire extinguishing performance, flame resistance and fuel resistance with respect to polar solvents.

Specific examples of the cationic polyamine based high molecular weight compound (A) include those detailed below, although it should be noted that the present invention is in no way limited by these specific examples.

A-I polyethyleneimine

A-II N-substituted polyethyleneimine Examples of the N-substituted group include —$C_nH_{2n+1}$, —$CONHC_nH_{2n+1}$, —$COC_nH_{2n+1}$, and —$(CH_2CH_2O)_n$—H (where n represents an integer of 1 to 6).

A-III condensation products of melamine and formaldehyde

A-IV condensation products of guanidine and formaldehyde

In the fire extinguishing composition of the present invention, additional cationic polyamine based high molecular weight compounds may be used in conjunction with the cationic polyamine based high molecular weight compound (A) used as the essential constituent. Examples of these compatible cationic polyamine based high molecular weight compounds include:

A-V

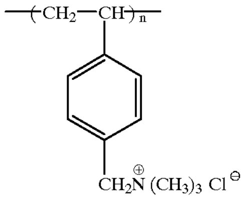

A-VI

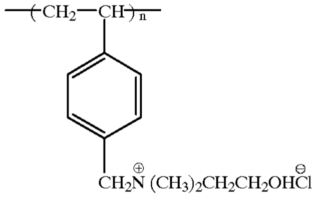

A-VII

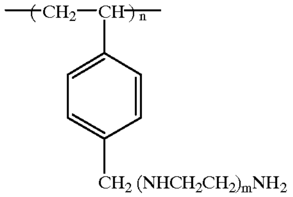

A-VIII

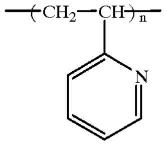

A-IX

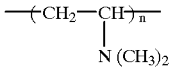

A-X

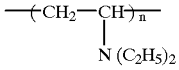

A-XI

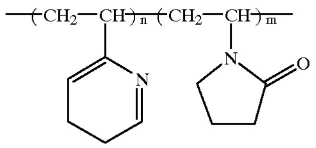

A fire extinguishing composition of the present invention must not only display the type of performance required of a foam type fire extinguishing composition with rapid fire extinguishing performance, flame resistance, and an ability to retain a layer of foam on the liquid surface of both non-water soluble hazardous materials and water soluble hazardous materials, namely fuel resistance, but must also satisfy certain basic properties of specific gravity, pour point, viscosity, hydrogen ion concentration, sedimentation, and corrosiveness and the like as stipulated in the national certification regulations, which are based on a ministerial ordinance (Ministry of Home Affairs Ordinance No. 26) brought into effect on Dec. 9, 1975 and defining the technical specifications relating to foam type fire extinguishing compositions. Consequently, in order to reach compatibility between fire extinguishing performance and basic performance, it is necessary to mix the main constituent of the fire extinguishing composition with a variety of other additives such as additional foam stabilizers, freezing point depressants, rust prevention agents, and pH regulators and the like.

A variety of cationic polyamine based high molecular weight compounds, such as those described above, can be used as the main constituent of a fire extinguishing composition which complies with the above requirements, but as mentioned above, it is a requirement that primary cationic groups within the compound account for no more than 40% by weight of the total cationic groups.

If a cationic polyamine based high molecular weight compound in which the proportion of primary cationic groups exceeds 40% by weight is used, then not only does sedimentation occur in an aqueous solution produced by mixing 3 to 6 parts by weight of the foam fire extinguishing composition concentrate with 97 to 94 parts of fresh water or sea water, which raises a dilution stability problem in that the composition does not satisfy one of the technical specifications of the Ministry of Home Affairs Ordinance No. 26, but furthermore, sedimentation can block the tips of the various types of nozzles used in actual fire fighting activity, resulting in unexpected situations which inhibit effective fire fighting.

Moreover, in terms of fire extinguishing performance, using a compound in which the proportion of primary cationic groups accounts for no more than 40% by weight of the total number of cationic groups results in even superior performance in terms of rapid fire extinguishing performance, flame resistance, fuel resistance, and reignition prevention performance.

Cationic polyamine based high molecular weight compounds in which the proportion of primary cationic groups accounts for no more than 40% by weight of the total number of cationic groups, and the secondary cationic groups account for at least 35% by weight of the total cationic groups, display even more superior effects in terms of fire extinguishing performance and dilution stability, and are consequently preferred.

Furthermore, in selecting a suitable cationic polyamine based high molecular weight compound, consideration of compatibility with additives such as additional foam stabilizers, freezing point depressants, rust prevention agents, and pH regulators, as well as consideration of other factors such as cost merit, safety with regards to both personnel and the environment, and the availability of the raw materials, results in polyethyleneimine or partially modified polyethyleneimine being used in preference.

Identification of the relative proportions of primary, secondary and tertiary cationic groups within the cationic polyamine based high molecular weight compound can be determined by using nuclear magnetic resonance spectroscopy to record a $^{13}$C-NMR spectrum, and then using the spectral peaks, chemical shift values, and integration curves to calculate the relative weight proportions of primary, secondary and tertiary cationic groups ($-NH_2$, $-NH-$, $-N=$ in the case of polyethyleneimine) within the molecule.

There are no particular restrictions on the method of manufacturing the cationic polyamine based high molecular weight compound according to the present invention, although a typical method of manufacturing polyethyleneimine comprises synthesizing ethyleneimine by a direct cyclodehydration of gaseous mono ethanolamine in the presence of a solid acid-base catalyst, and then subjecting the ethyleneimine produced by this method to a ring-opening polymerization in the presence of an acid catalyst to form polyethyleneimine. Reaction kinetics mean that polyethyleneimine manufactured in this manner will not be a perfectly linear macromolecule, but will rather be a high molecular weight compound with a branched structure comprising primary, secondary and tertiary amine groups, as shown in the chemical equation below. Furthermore, the acid catalyst used in the ring-opening polymerization of ethyleneimine may utilize any of the mineral acid, inorganic or organometallic based Lewis acids, although the branched structure will vary depending on the catalyst used, as will the ratio of primary, secondary and tertiary amines within the produced molecule.

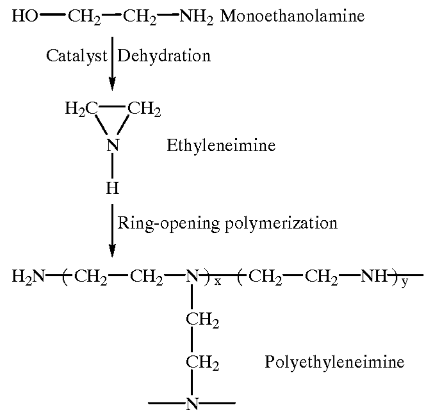

Furthermore, in order to improve fuel resistance, it is preferable that a surfactant (B) with an anionic hydrophilic group is also included in the fire extinguishing composition of the present invention. A surfactant with an anionic hydrophilic group undergoes an electrostatic interaction with the cationic polyamine based high molecular weight compound (A), and the surfactant in the present invention is a compound with at least one anionic hydrophilic group within each molecule.

Preferred anionic hydrophilic groups include groups such as $-COOH$, $-SO_3H$, $-OSO_3H$, and $-OP(OH)_2$, with $-SO_3H$ being particularly desirable. Furthermore, in terms of counter ions for the cationic groups, compounds with organic or inorganic anionic groups may also be used.

The hydrophilic group of the surfactant may incorporate one or more of the same, or different anionic groups, or alternatively, an amphoteric ion type surfactant which incorporates a cationic hydrophilic group and/or a nonionic group in addition to the anionic hydrophilic group, is also possible. Of these various options, amphoteric ion type surfactants are preferred for compatibility reasons.

Examples of the hydrophobic group of the surfactant include aliphatic hydrocarbon groups of 6 or more carbon atoms, dihydrocarbyl siloxane chains, or fluorinated aliphatic groups of 3 to 20 carbon atoms and preferably 6 to 16 carbon atoms. Of these hydrophobic groups, fluorinated aliphatic groups are particularly desirable as they offer improved fuel resistance. Furthermore, the surfactant may also comprise a mixture of different surfactants with different hydrophobic groups.

The surfactants with an anionic hydrophilic group (B) used in the fire extinguishing composition of the present invention can be broadly classified into: (B-1) fluorine containing amino acid type amphoteric surfactants, (B-2) fluorine containing aminosulfonate type surfactants, (B-3) fluorine containing aminocarboxylate type surfactants, (B-4) fluorine containing trianion type amphoteric surfactants, (B-5) fluorine containing tricarboxylic acid type amphoteric surfactants, (B-6) fluorine containing sulfobetaine type amphoteric surfactants, (B-7) fluorine containing aminosulfate type surfactants, (B-8) fluorine containing sulfatobetaine type surfactants, (B-9) fluorine containing sulfobetaine type surfactants, (B-10) fluorine containing amine oxide type surfactants, and (B-11) other surfactants.

The fluorine containing amino acid type amphoteric surfactants B-1 are compounds represented by the general formula (B-1):

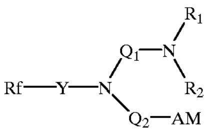

(In the formula, Rf represents a fluorinated aliphatic group of 3 to 20 carbon atoms, Y represents either —$SO_2$— or —CO—, and $Q_1$ and $Q_2$ represent organic bivalent linking groups such as aliphatic hydrocarbon groups, aliphatic hydrocarbon groups substituted with hydroxyl groups, aromatic hydrocarbon groups, substituted aromatic hydrocarbon groups, or combinations thereof, with preferred groups including straight chain alkylene groups of 1 to 6 carbon atoms, the 2-hydroxypropan-1,3-diyl group, the 2-methoxypropan-1,3-diyl group, the 2-ethoxypropan-1,3-diyl group, and the 2-propoxypropan-1,3-diyl group. $R_1$ and $R_2$ represent hydrogen atoms, aliphatic hydrocarbon groups of 1 to 12 carbon atoms, or aliphatic hydrocarbon groups which have been substituted with hydrophilic groups, or $R_1$ and $R_2$ may be linked together forming a ring with the adjacent nitrogen atom. A represents an anionic hydrophilic group such as —$COO^-$, —$SO_3^-$, —$OSO_3^-$, or —OP(OH)$O^-$. M represents a hydrogen atom, an alkali metal, an alkali earth metal, an ammonium group, or an organic cationic group.)

Specific examples of this (B-1) compound are shown below, although the present invention is not limited to the specific examples shown.

B-1-a

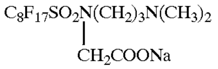

B-1-b

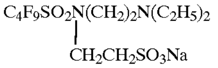

B-1-c

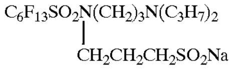

B-1-d

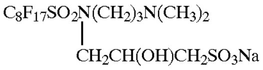

B-1-e

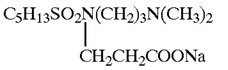

B-1-f

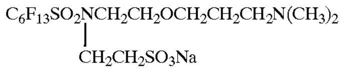

B-1-g

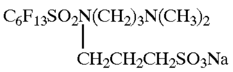

B-1-h

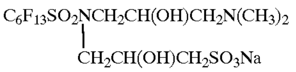

-continued

B-1-i

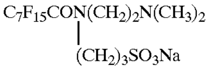

B-1-j

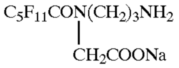

B-1-k

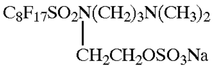

B-1-l

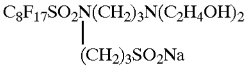

B-1-m

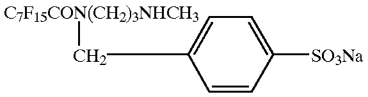

B-1-n

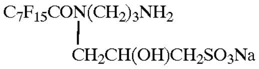

B-1-o

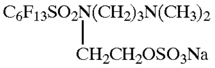

B-1-p

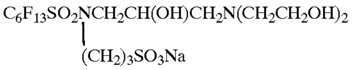

B-1-q

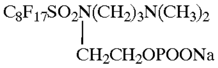

B-1-r

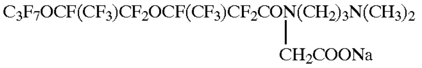

B-1-s

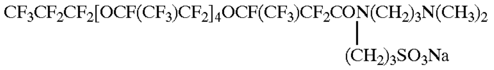

B-1-t

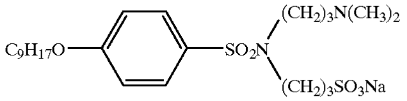

B-1-u

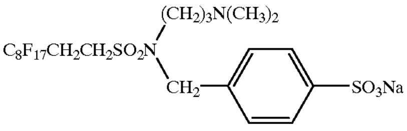

B-1-v

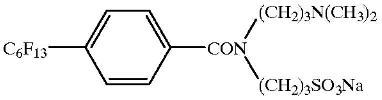

The fluorine containing aminosulfonate type surfactants (B-2) are compounds represented by the general formula (B-2):

$$Rf—Z—Q_1—N(R)—Q_2—SO_2M$$

(In the formula, Rf represents a fluorinated aliphatic group of 3 to 20 carbon atoms, Z represents a bivalent linking group such as —$SO_2N(R_1)$—, —$CON(R_1)$—, —$(CH_2CH_2)_i$ $SO_2N(R_1)$—, or compounds covered by the general formula

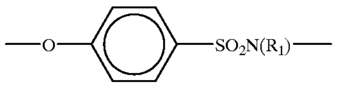

or the general formula

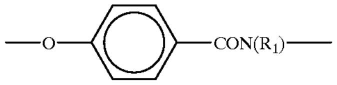

(where $R_1$ is a hydrogen atom or an alkyl group of 1 to 12 carbon atoms, and i is an integer from 1 to 10), and $Q_1$ represents a straight chain alkylene group of 1 to 6 carbon atoms, the 2-hydroxypropan-1,3-diyl group, the 2-ethoxypropan-1,3-diyl group, or the 2-propoxypropan-1,3-diyl group.

R represents a hydrogen atom, an alkyl group of 1 to 3 carbon atoms, a hydroxyalkyl group, $—Q_2SO_3M$, or $—(CH_2)_kCOOM$ (where k is an integer of 1 to 4), $Q_2$ represents a straight chain alkylene group of 1 to 5 carbon atoms, the 2-hydroxypropan-1,3-diyl group, the 2-ethoxypropan-1,3-diyl group, the 2-propoxypropan-1,3-diyl group, or a bivalent linking group represented by the general formula below.

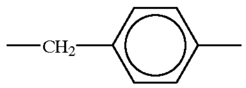

M represents a hydrogen atom, an alkali metal, an alkali earth metal, or a cationic atom or group of atoms represented by the formula below.

$$—N(H)_m(R_4)_{4-m}$$

(In the formula, $R_4$ represents an alkyl group of 1 to 3 carbon atoms, or a hydroxyalkyl group, and m is an integer of 0 to 4.))

Specific examples of this (B-2) compound are shown below, although the present invention is not limited by the specific examples shown.

B-2-a $C_8F_{17}SO_2NH(CH_2)_3N(CH_3)(CH_2)_3SO_3Na$

B-2-b $C_8F_{17}SO_2NH(CH_2)_3N(CH_2CH_2OH)(CH_2)_3SO_3Na$

B-2-c $C_6F_{13}SO_2N(CH_3)(CH_2)_3N(C_2H_5)CH_2CH(OH)CH_2SO_3K$

B-2-d $C_7F_{15}CONH(CH_2)_2N(CH_3)(CH_2)_3SO_3Na$

B-2-e

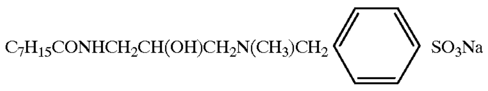

B-2-f $C_8F_{17}CH_2CH_2SO_2NH(CH_2)_3N(CH_3)(CH_2)_3SO_3Na$

-continued

B-2-g

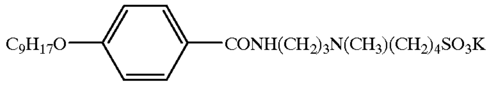

B-2-h

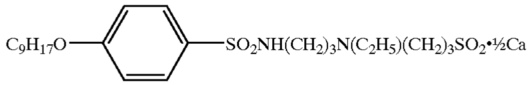

B-2-i

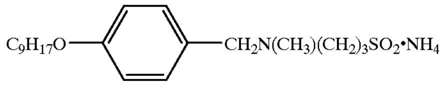

B-2-j $C_9F_{17}(OCH_2CH_2)_2N(CH_3)(CH_2)_3SO_3{\bullet}N(C_2H_5)_4$

B-2-k $C_7F_{15}CH_2CH_2SCH_2COO(CH_2)_2N(CH_3)(CH_2)_2SO_3Na$

B-2-l $C_3F_7OCF(CF_3)CF_2OCF(CF_3)CF_2CONH(CH_2)_3N(CH_3)(CH_2)_3SO_3Na$

B-2-m $CF_3CF_2CF_2[OCF(CF_3)CF_2]_4OCF(CF_3)CF_2CONH(CH_2)_3N(CH_3)(CH_2)_2SO_3K$

B-2-n

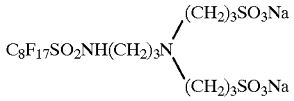

B-2-o

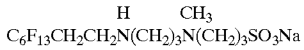

B-2-p

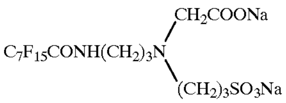

The fluorine containing aminocarboxylate type surfactants (B-3) are compounds represented by the general formula (B-3):

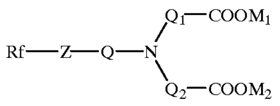

(In the formula, Rf represents a polyfluoroalkyl group, a polyfluoroalkenyl group, a polyfluorocyclohexyl group, a polyfluorocyclohexyl alkyl group or a polyfluorocyclohexyl alkenyl group of 3 to 20 carbon atoms which may also incorporate oxygen atoms, and Z represents a linking group of one of the formulae below.

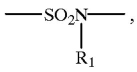 , 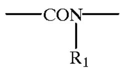 , 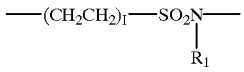 ,

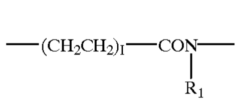 , 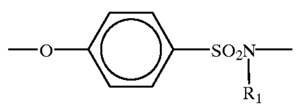

or

-continued

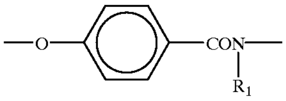

(In the formulae, $R_1$ represents an alkyl group, an alkenyl group or an aromatic ring containing monovalent group incorporating of 1 to 18 carbon atoms, and i represents an integer of 1 to 3.) Q represents a bivalent linking group of one of the formula below.

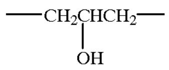

$-(CH_2)_l-$, $-(CH_2)_m-O-(CH_2)_n-$or $-(CH_2)_p-O-(CH_2)_2-O-(CH_2)_q-$ (In the formulae, 1 represents an integer of 1 to 6, m and n each represent an integer of 2 to 6, and p and q each represent the number 2 or 3 respectively.) $Q_1$ and $Q_2$ each represent a alkylene group of 1 to 3 carbon atoms. $M_1$ and $M_2$ each represent a hydrogen atom or an inorganic or an organic cation.)

Specific examples of this (B-3) compound are shown below, although the present invention is not limited by the specific examples shown.

B-3-a

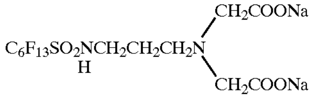

B-3-b

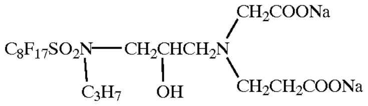

B-3-c

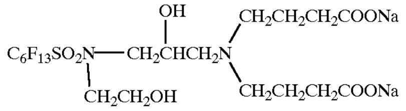

B-3-d

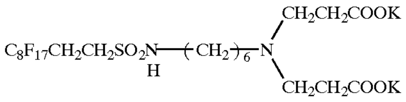

B-3-e

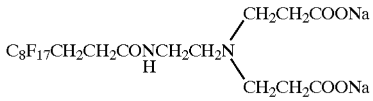

B-3-f

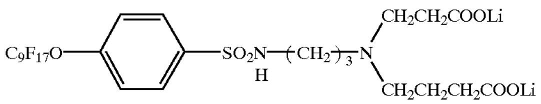

B-3-g

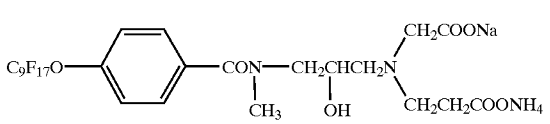

-continued

B-3-h

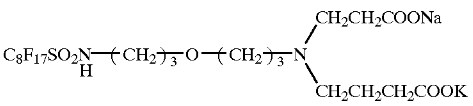

B-3-i

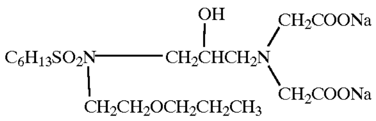

B-3-j

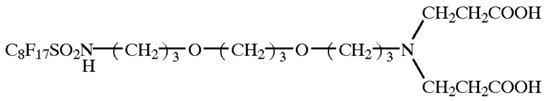

B-3-k

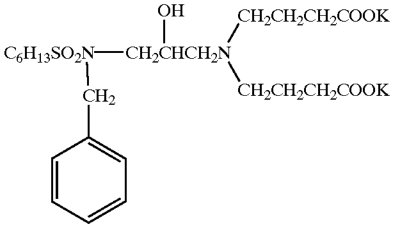

The fluorine containing trianion type amphoteric surfactants (B-4) are compounds represented by the general formula (B-4):

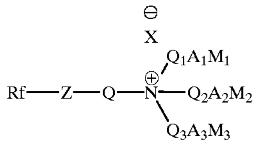

(In the formula, Rf represents a fluorinated aliphatic group of 3 to 20 carbon atoms, Z represents a bivalent linking group, Q represents a straight chain alkylene group of 1 to 6 carbon atoms, the 2-hydroxypropan-1,3-diyl group, $-(CH_2)_m-O-(CH_2)_n-$ (where m and n are each integers from 2 to 6) or $-(CH_2)_p-O-(CH_2)_2-O-(CH_2)_q-$ (where p and q each represent the number 2 or 3 respectively). $Q_1$, $Q_2$ and $Q_3$ represent bivalent groups such as aliphatic hydrocarbon groups of 1 to 8 carbon atoms, aliphatic hydrocarbon groups of 1 to 8 carbon atoms with substituted hydroxyl groups, or bivalent groups represented by the general formula

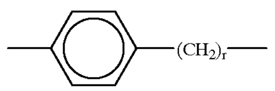

(where in the formula, r represents either the number 1 or the number 2), $A_1$ represents an anionic atom grouping of $-SO_3^-$ or $-OSO_3^-$, $A_2$ and $A_3$ also represents an anionic atom grouping of $-SO_3^-$ or $-OSO_3^-$, $-COO^-$, or $-OP(=O)(OH)O^-$, $M_1$, $M_2$ and $M_3$ each represent a hydrogen atom or an inorganic or an organic cation, and $X^-$ represents an inorganic or an organic anion such as $OH^-$, $Cl^-$, $Br^-$, $I^-$, $ClO_4^-$, $\frac{1}{2}SO_4^{2-}$, $CH_3SO_4^-$, $NO_3^-$, $CH_3COO^-$ or the phosphate ion.)

Specific examples of this (B-4) compound are shown below, although the present invention is not limited by the specific examples shown.

B-4-a

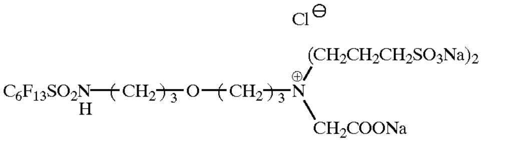

B-4-b

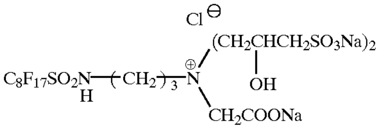

B-4-c

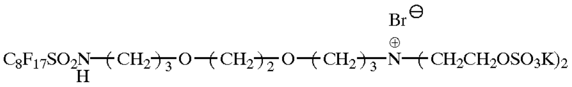

B-4-d

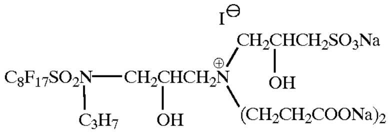

B-4-e

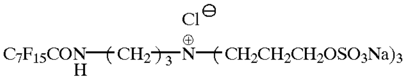

B-4-f

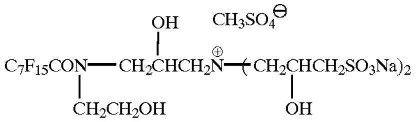

B-4-g

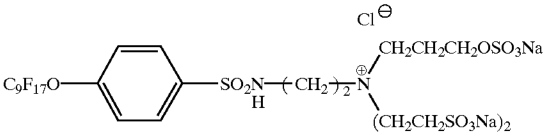

B-4-h

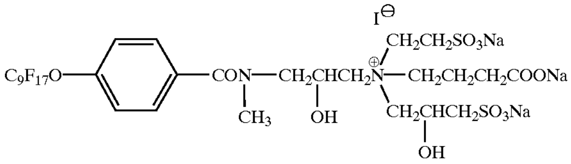

B-4-i

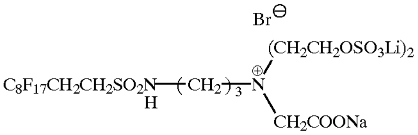

B-4-j

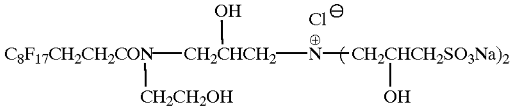

B-4-k

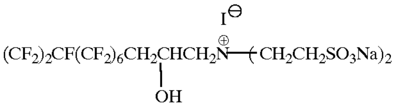

B-4-l

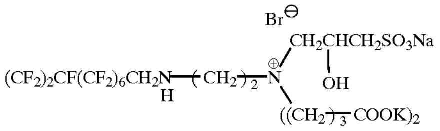

B-4-m

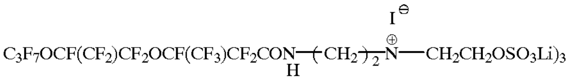

B-4-n

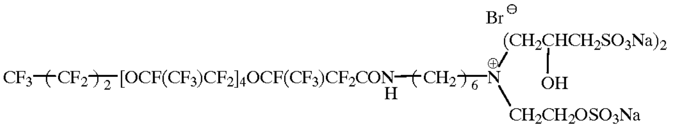

B-4-o

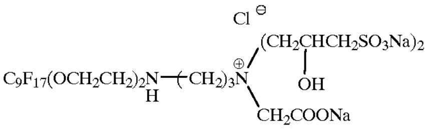

B-4-p

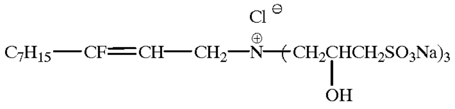

The fluorine containing tricarboxylic acid type amphoteric surfactants (B-5) are compounds represented by the general formula (B-5):

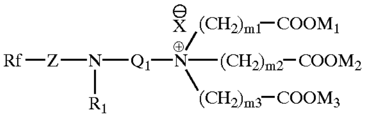

(In the formula, Rf represents a fluorinated aliphatic group of 3 to 20 carbon atoms, and Z represents $—SO_2—$, —CO—, $—(CH_2)_l—SO_2—$, $—(CH_2)_l—CO—$ (where l represents an integer from 1 to 6), or a bivalent group represented by either the formula

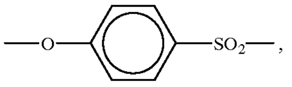

, or the formula

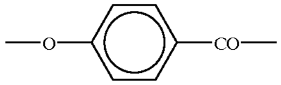

$R_1$ represents the 2-hydroxyethyl group, a group represented by the general formula $-(CH_2)_a-O-(CH_2)_b-CH_3$ (where a represents an integer from 2 to 10, and b represents an integer from 1 to 9), or an alkyl group of 1 to 12 carbon atoms, $Q_1$ represents a straight chain alkylene group of 2 to 6 carbon atoms, the 2-hydroxypropan-1,3-diyl group, or a bivalent group represented by the general formula $-(CH_2)_d-O-(CH_2)_e-$ (where d and e each represent an integer from 2 to 6), X represents an inorganic or an organic anion, $m_1$, $m_2$ and $m_3$ each represent an independent integer from 1 to 3, and $M_1$, $M_2$ and $M_3$ each represent independently a hydrogen atom, or an inorganic or an organic cation.)

Specific examples of this (B-5) compound are shown below, although the present invention is not limited by the specific examples shown.

B-5-a

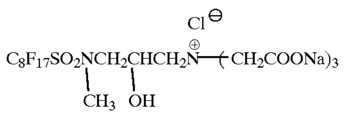

B-5-b

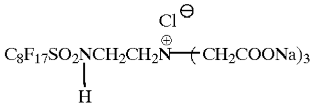

B-5-c

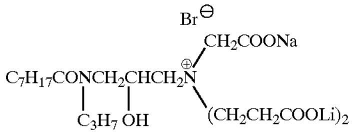

B-5-d

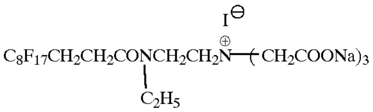

B-5-e

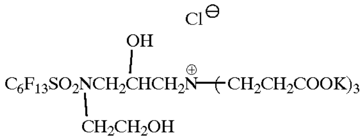

B-5-f

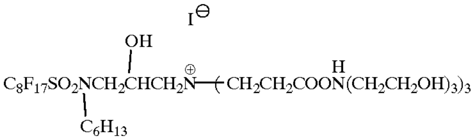

B-5-g

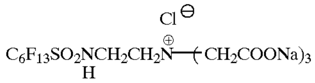

-continued

B-5-h

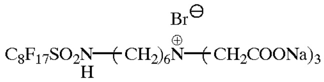

B-5-i

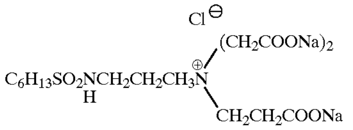

B-5-j

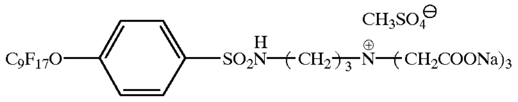

B-5-k

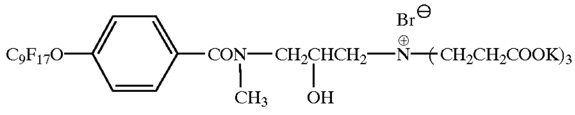

B-5-l

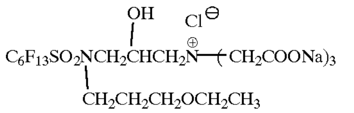

B-5-m

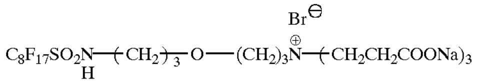

The fluorine containing sulfobetaine type amphoteric surfactants (B-6) are compounds represented by the general formula (B-6):

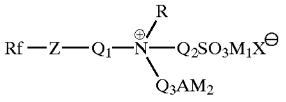

(In the formula, Rf represents a group comprising a fluorinated aliphatic group of 3 to 20 carbon atoms, Z represents a bivalent linking group incorporating a sulfonamide group or a carbonamide group, $Q_1$, $Q_2$ and $Q_3$ each represent independently a bivalent aliphatic group of 1 to 12 carbon atoms, an aliphatic hydrocarbon group substituted with a hydroxyl group, an aromatic hydrocarbon group, or a bivalent group formed through a combination of the above groups. R represents a hydrogen atom, a hydrocarbyl group of 1 to 12 carbon atoms, or a $-(CH_2CH_2O)_iH$ or a $-(CH_2CH(CH_3)O)_iH$ group (where i represents an integer of 1 to 20), A represents an anionic atom grouping of $-SO_2^-$, $-COO^-$, $-OSO_2^-$, or $-OP(=O)(OH)O^-$, $M_1$ and $M_2$ each represent a hydrogen atom or an inorganic or an organic cation, and X represents an inorganic or an organic anion.)

Specific examples of this (B-6) compound are shown below, although the present invention is not limited by the specific examples shown.

B-6-a $C_8F_{17}SO_2\overset{H}{H}(CH_2)_3\overset{\oplus}{N}(CH_3)[(CH_2)_3SO_3Na]_2Cl^{\ominus}$ B-6-b $C_8F_{17}SO_2\overset{H}{N}(CH_2)_3\overset{\oplus}{N}(CH_2CH_2OH)[(CH_2)_3SO_3Na][CH_2COONa]Br^{\ominus}$ B-6-c $C_6F_{13}SO_2\overset{H}{N}(CH_2)_6\overset{\oplus}{N}(C_2H_5)[CH_2CH(OH)CH_2SO_3Na]_2I^{\ominus}$ B-6-d $C_7F_{16}CO\overset{CH_3}{N}(CH_2)_3O(CH_2)_3\overset{\oplus}{N}(CH_3)[(CH_2)_3SO_3K][(CH_2)_2OSO_3K]Cl^{\ominus}$ B-6-e

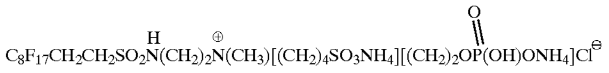

B-6-f

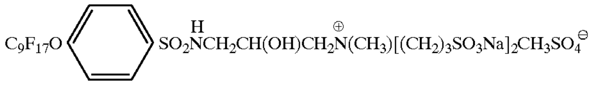

B-6-g

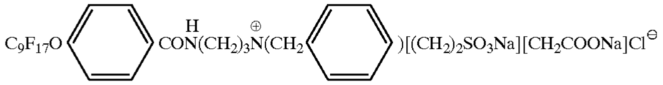

B-6-h $(C_6F_{13})_2NCF_2CF_2CO\overset{H}{N}(CH_2)_3\overset{\oplus}{N}(CH_3)[(CH_2)_3SO_3Na][CH_2COONa]Cl^{\ominus}$ B-6-i $C_8F_{17}CH_2CH_2CO\overset{C_2H_5}{N}(CH_2)_3\overset{\oplus}{N}(CH_3)[(CH_2)_3SO_3Na][(CH_2)_2OSO_3Na]Cl^{\ominus}$ B-6-j

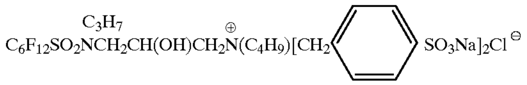

The fluorine containing aminosulfate type surfactants (B-7) are compounds represented by the general formula (B-7):

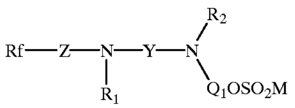

(In the formula, Rf represents a fluorinated aliphatic group of 3 to 20 carbon atoms, Z represents $-SO_2-$, $-CO-$, a bivalent group represented by one of the formulae

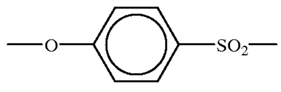 ,

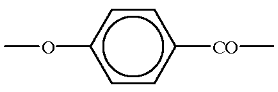 , $-(CH_2)_a-SO_2-$ or $-(CH_2)_a-CO$ (where a represents an integer of 1 to 10), $R_1$ represents a hydrogen atom, an alkyl group of 1 to 12 carbon atoms, a $-(CH_2)_b-OR_3$ group or a $-(CH_2CH_2O)_d-R_2$ group (where b represents an integer from 1 to 10, d represents an integer of 1 to 20, and $R_3$ represents a lower alkyl group or alkoxyl group), and Y represents $-(CH_2)_e-$, $-(CH_2)_p-O-(CH_2)_2-O-(CH_2)_q-$ or $-(CH_2)_g-O-(CH_2)_h-$ (where e represents an integer of 2 to 12, p and q each represent independently a value of 2 or 3, and g and h each represent independently an integer of 1 to 6). $R_2$ represents a hydrogen atom, an alkyl group, alkenyl group, or hydroxyl substituted alkyl group of 1 to 18 carbon atoms, a $-(CH_2CH_2)_m-H$ group (where m represents an integer of 2 to 20), $Q_1OSO_3M$, $Q_1SO_2M$ or $(CH_2)_iCOOM$ (where i represents an integer from 1 to 4). $Q_1$ represents a straight chain alkyl group of 2 to 12 carbon atoms, the 2-hydroxypropan-1,3-diyl group or $-(CH_2CH_2O)_k-CH_2CH_2-$ (where k represents an integer from 1 to 50). M represents a hydrogen atom or an inorganic or an organic cation.)

Specific examples of this (B-7) compound are shown below, although the present invention is not limited by the specific examples shown.

B-7-a $C_8F_{17}SO_2\overset{H}{N}(CH_2)_3\overset{H}{N}CH_2CH_2OSO_3Na$

B-7-b

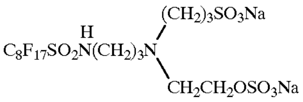

B-7-c $C_7F_{15}CON(CH_3)(CH_2)_3N(CH_3)CH_2CH_2OSO_3NH_4$

B-7-d $C_7F_{15}CONH(CH_2)_6N(CH_2CH_2OSO_3Na)_2$

-continued

B-7-e

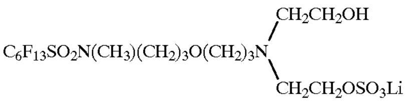

B-7-f

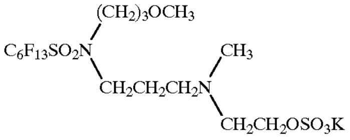

B-7-g

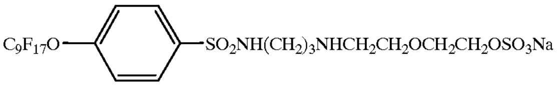

B-7-h

B-7-i $C_8F_{17}CH_2CH_2SO_2NH(CH_2)_3N(CH_3)(CH_2)_4OSO_3Na$

B-7-j

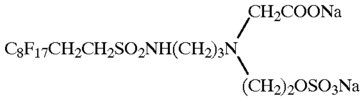

B-7-k

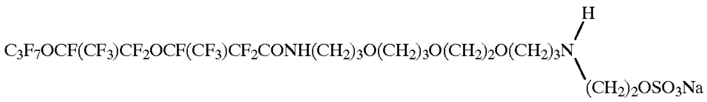

The fluorine containing sulfatobetaine type surfactants (B-8) are compounds represented by the general formula (B-8):

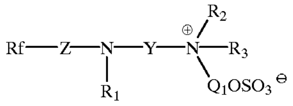

(In the formula, Rf represents a fluorinated aliphatic group of 3 to 20 carbon atoms, Z represents $—SO_2—$, —CO—,

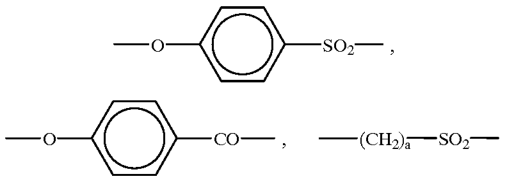

or $—(CH_2)_a—CO—$ (where a represents an integer of 1 to 10) , $R_1$ represents a hydrogen atom, an alkyl group of 1 to 12 carbon atoms, a $—(CH_2)_b—OR_3$ group or a $—(CH_2CH_2O)_d—R_2$ group (where b represents an integer from 1 to 10, d represents an integer of 1 to 20, and $R_2$ represents a lower alkyl group or alkoxyl group) , and Y represents $—(CH_2)_e—$, $—(CH_2)_p—O—(CH_2)_2—O—(CH_2)_q—$ or $—(CH_2)_g—O—(CH_2)_h—$ (where e represents an integer of 2 to 12, p and q each represent independently a value of 2 or 3, and g and h each represent independently an integer of 1 to 6) $R_2$ and $R_3$ each represent independently an alkyl group, alkenyl group, hydroxyl substituted alkyl group, or aromatic substituted alkyl group of 1 to 18 carbon atoms, or a $—(CH_2CH_2O)_i—H$ group (where i represents an integer of 2 to 20), or alternatively $R_2$ and $R_3$ may be linked together to form a heterocyclic ring with the adjacent nitrogen atom, and $Q_1$ represents a straight chain alkylene chain of 2 to 12 carbon atoms, the 2-hydroxypropan-1,3-diyl group or $—(CH_2CH_2O)_k—CH_2CH_2—$ (where k represents an integer from 1 to 50).)

Specific examples of this (B-8) compound are shown below, although the present invention is not limited by the specific examples shown.

B-8-a

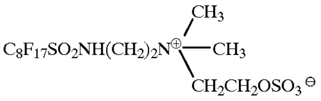

B-8-b

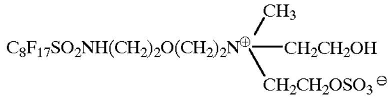

B-8-c

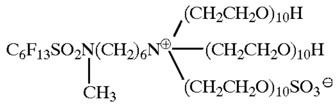

B-8-d

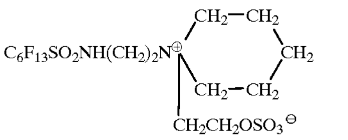

B-8-e

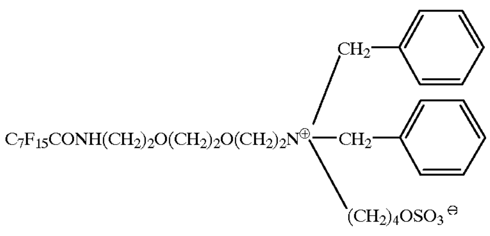

-continued

B-8-f

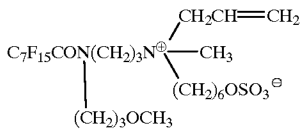

B-8-g

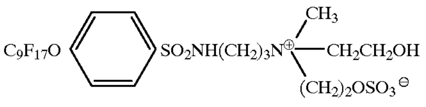

B-8-h

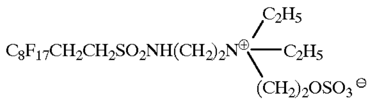

B-8-i

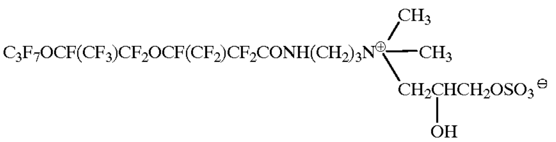

The fluorine containing sulfobetaine type surfactants (B-9) are compounds represented by the general formula (B-9):

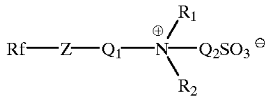

(In the formula, Rf represents a fluorinated aliphatic group of 3 to 20 carbon atoms which may incorporate an oxygen atom, or a fluorinated alicyclic group, Z represents a bivalent linking group, $Q_1$ represents a straight chain alkylene chain of 1 to 6 carbon atoms, or $-(CH_2)_m-O-(CH_2)_n-$ or $-(CH_2)_p-O-(CH_2)_2-O-(CH_2)_q-$ (where m and n each represent an integer of 2 to 6, and p and q each represent independently a value of 2 or 3), $Q_2$ represents a straight chain alkylene chain of 1 to 6 carbon atoms, the 2-hydroxypropan-1,3-diyl group or $-(CH_2CH_2O)_r-CH_2CH_2-$ (where r represents an integer from 1 to 3), and $R_1$ and $R_2$ each represent independently an alkyl group of 1 to 8 carbon atoms, an alkyl group or alkenyl group which incorporates 1 to 3 ether oxygen atoms, a benzyl group or a $-(CH_2CH_2O)_s-H$ group (where s represents an integer from 1 to 11).)

Specific examples of this (B-9) compound are shown below, although the present invention is not limited by the specific examples shown.

B-9-a

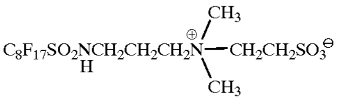

B-9-b

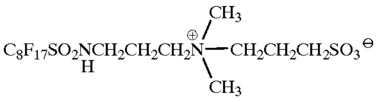

B-9-c

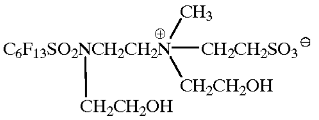

B-9-d

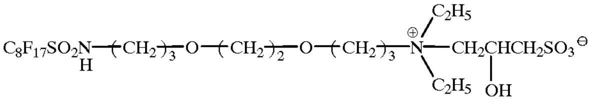

B-9-e

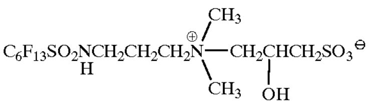

B-9-f

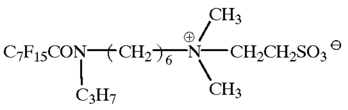

B-9-g

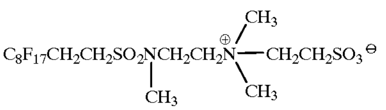

B-9-h

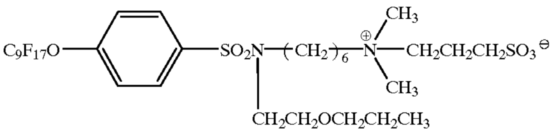

-continued

B-9-i

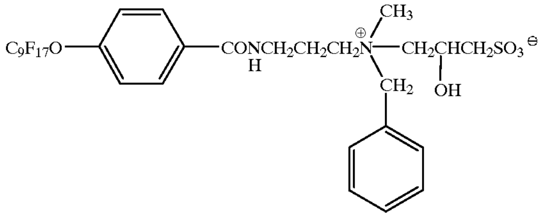

B-9-j

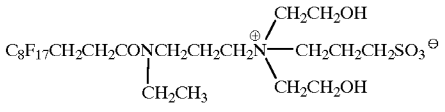

B-9-k

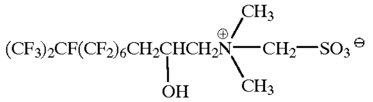

B-9-l

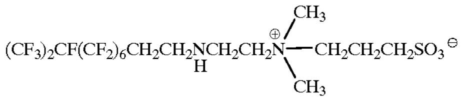

B-9-m

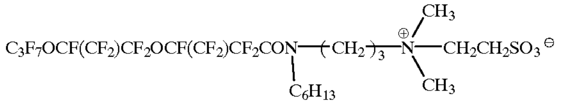

B-9-n

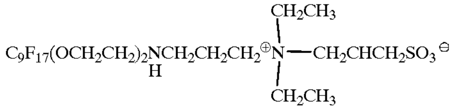

B-9-o

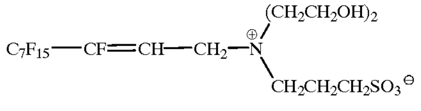

In the compounds from B-1 to B-9 described above, $M_1$, $M_2$ and $M_3$ each represent independently a hydrogen atom or an inorganic or an organic cation. Examples of preferred inorganic or organic cations include $Li^+$, $Na^+$, $K^+$, $Ca^+$, $Mg^+$, $[N(H)_s(R)_{4-s}]^+$ (where R is an alkyl group of 1 to 4 carbon atoms or a hydroxyethyl group, and s represents an integer from 0 to 4), or

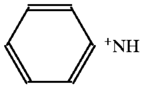

In contrast, X represents an inorganic or an organic anion. Examples of preferred inorganic or organic anions include $OH^-$, $Cl^-$, $Br^-$, $I^-$, $ClO_4^-$, $½SO_4^-$, $CH_3SO_4^-$, $NO_3^-$, $CH_3COO^-$ or the phosphate ion.

Furthermore, the fluorine containing amine oxide type surfactants (B-10) are compounds represented by the general formula (B-10):

B-10

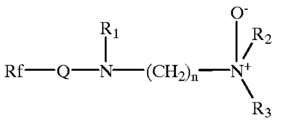

(In the formula, Rf represents a fluorinated aliphatic group of 8 to 18 carbon atoms, or a fluorinated alicyclic group of 10 to 20 carbon atoms with either an ether oxygen atom or thioether linkage, Q represents —$SO_2$— or —CO—, $R_1$ represents H, an alkyl group of 1 to 6 carbon atoms, a halogenated alkyl group of 1 to 6 carbon atoms, —OH, —SH, an alkoxyl group of 1 to 6 carbon atoms, a thioalkyl group of 1 to 6 carbon atoms, —$NO_2$, —CN, or NRR'— (where R and R' each represent H or an alkyl group of 1 to 6 carbon atoms), $R_2$ and $R_3$ each represent H, an alkyl group of 1 to 6 carbon atoms, a halogenated alkyl group of 1 to 6 carbon atoms, —OH, —SH, an alkoxyl group of 1 to 6 carbon atoms, a thioalkyl group of 1 to 6 carbon atoms, —$NO_2$, —CN, NRR'— (where R and R' each represent H or an alkyl group of 1 to 6 carbon atoms), or an alicyclic group which incorporates a hetero atom, an alicyclic group which does not incorporate a hetero atom, or an alicyclic group in which either the entire alicyclic ring, or a portion thereof, is substituted with alkyl groups, and finally n is an integer from 2 to 6).

Specific examples of this (B-10) compound are the compounds represented by the formulae (B-10-a) to (B-10-o) shown below, although the present invention is not limited to the compounds shown.

B-10-a $C_8F_{17}SO_2NHC_3H_6N(CH_3)_2 \rightarrow O$

B-10-b $C_{10}F_{21}SO_2NHC_3H_6N(CH_3)_2 \rightarrow O$

B-10-c $C_9F_{19}CONHC_3H_6N(CH_3)_2 \rightarrow O$

B-10-d $C_{11}F_{23}CONHC_3H_6N(CH_3)_2 \rightarrow O$

B-10-e $C_4F_9O[CF(CF_3)CF_2O]_2CF(CF_3)CONHC_3H_6N(CH_3)_2 \rightarrow O$

-continued

B-10-f

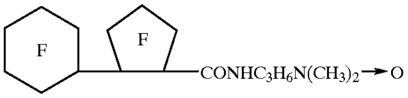

B-10-g

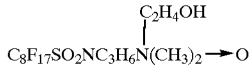

B-10-h $C_6F_{13}SO_2NHC_3H_6N(CH_3)_2 \rightarrow O$

B-10-i $C_6F_{13}C_2H_4SO_2NHC_3H_6N(CH_3)_2 \rightarrow O$

B-10-j $C_7F_{15}CONHC_3H_6N(CH_3)_2 \rightarrow O$

B-10-k

B-10-l

B-10-m

B-10-n

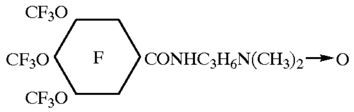

B-10-o $C_5F_{11}C_2H_4C(O)N(H)C_3H_6N(CH_3)_2 \rightarrow O$

Examples of surfactants (B-11) other than the surfactants (B-1) to (B-10) which are able to be used in the fire extinguishing composition of the present invention include compounds represented by the formulae (B-11-a) to (B-11-g) shown below, although the present invention is not limited to the compounds shown.

B-11-a

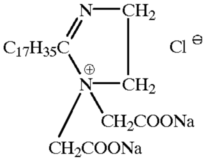

B-11-b $C_{11}H_{23}CONHCH_2CH_2N(CH_2COONa)_2$

B-11-c $C_{17}H_{35}CONH{-}(CH_2)_3{-}\overset{\oplus}{N}{-}[(CH_2)_3{-}SO_3Na]_3Cl^{\ominus}$ B-11-d

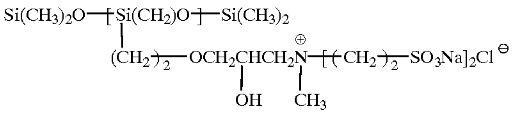

-continued

B-11-e $C_8F_{17}SO_2N(C_3H_7)CH_2COOK$

B-11-f $C_8F_{17}SO_2N(C_3H_7)CH_2CH_2OSO_3Na$

B-11-g $C_7F_{15}CON(C_3H_7)(CH_2)_3SO_3Na$

In those cases where a surfactant (B) is included in the fire extinguishing composition of the present invention, the mixing proportions of the cationic polyamine based high molecular weight compound (A) and the surfactant (B) should preferably be within a weight ratio range from 5:1 to 1:3, with ratios within a range from 3:1 to 1:1 being even more desirable.

By adding a polybasic acid compound (C) to a fire extinguishing composition of the present invention, the polybasic acid compound undergoes an electrostatic interaction with the polyethyleneimine or derivative thereof, thereby improving the flame resistance and fuel resistance of the composition even further.

Provided the polybasic acid compound (C) is a compound which incorporates an acid group within the molecule, there are no restrictions on the type or the number of acid groups, nor on the length of the carbon chain or the molecular weight, and any compound can be used. Furthermore, such a polybasic acid compound (C) is a compound with no surfactant properties, and suitable examples include dibasic, tribasic, tetrabasic, pentabasic or hexabasic acids of 3 to 24 carbon atoms with an aromatic group, an aliphatic group or a heterocyclic ring or the like, or the alkali metal salts or ammonium salts of such acids. The acid group in the polybasic acid compound (C) may be a carboxylic acid group, a sulfonic acid group, or a phosphoric acid group or the like. Furthermore, in those cases where polybasic acid compounds are used, either a single compound, or two or more different compounds may be used in combination. Of these various polybasic acid compounds (C), dibasic acid compounds of 4 to 18 carbon atoms are particularly desirable from the viewpoint of compatibility.

Specific examples of the polybasic acid compound (C) include compounds represented by the formulae (C-1) to (C-32) shown below, as well as the alkali metal salts (Na salts, K salts, Li salts and the like) or ammonium salts thereof, although the present invention is not limited to these specific compounds.

C-1

$HOOC{-}(CH_2)_n{-}COOH$ (n is an integer of 2 to 12)

C-2

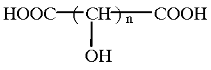

C-3

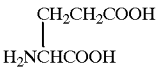

C-4

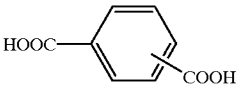

-continued

C-5

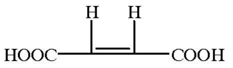

C-6

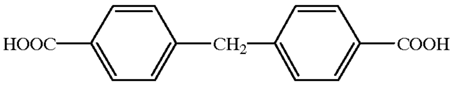

C-7

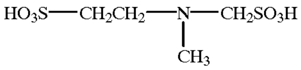

C-8

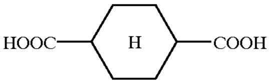

C-9

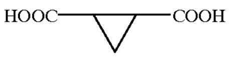

C-10

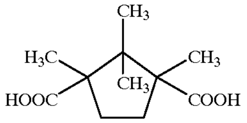

C-11

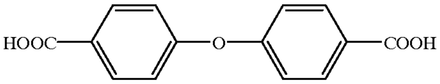

C-12

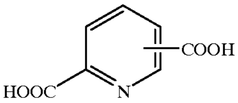

C-13

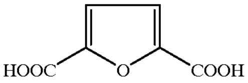

C-14

$HOOC-CH_2-O-CH_2-COOH$

C-15

$HOOC-CH_2-O-CH_2CH_2-O-CH_2-COOH$

C-16

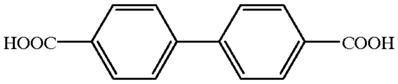

C-17

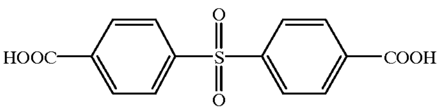

C-18

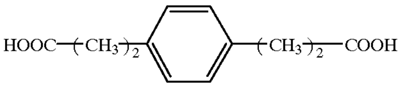

C-19

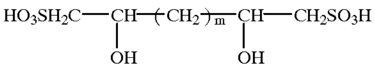

(m is an integer of 2 to 6)

-continued

C-20

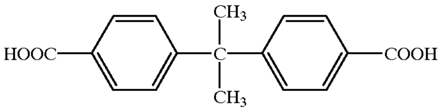

C-21

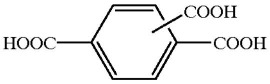

C-22

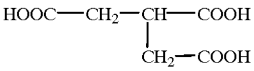

C-23

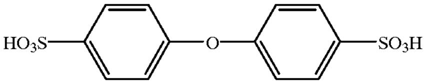

C-24

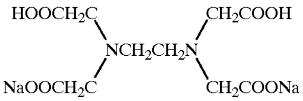

C-25

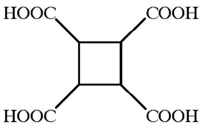

C-26

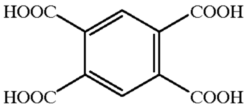

C-27

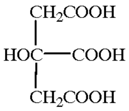

C-28

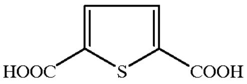

C-29

$HO_3S-(CH_2)_l-SO_3H$ (l is an integer of 2 to 6)

C-30

$HO_3SO-(CH_2)_p-OSO_3H$ (p is an integer of 2 to 6)

C-31

$HO_3PO-(CH_2)_q-OPO_3H$ (q is an integer of 2 to 6)

C-32

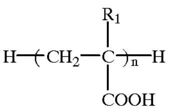

($R_1$ is a hydrogen atom or a methyl group, and n is an integer of 5 to 11)

In those cases where a polybasic acid compound (C) is included in the fire extinguishing composition of the present invention, the mixing proportions of the cationic polyamine based high molecular weight compound (A) and the polybasic acid compound (C) should preferably be within a weight ratio range from 5:1 to 1:3, with ratios within a range from 4:1 to 1:1 being even more desirable.

In those cases where a surfactant with an anionic hydrophilic group (B) and a polybasic acid compound (C) are included in the fire extinguishing composition of the present invention, the mixing proportions of the cationic polyamine based high molecular weight compound (A) with the surfactant with an anionic hydrophilic group (B) and the polybasic acid compound (C) will vary depending on the combination of the constituents, although typically weight ratios (B):[(A)+(C)] within a range from 2:1 to 1:50 are preferable, with ratios within a range from 1:1 to 1:10 being even more desirable. By maintaining the mixing ratio of the other constituents relative to the surfactant with an anionic hydrophilic group (B) within the above range, a water insoluble complex does not form with the surfactant with an anionic hydrophilic group (B), and so the foaming properties can be maintained. Even if the mixing ratio is greater than the above range, no marked deterioration is observed in foaming ability, flame resistance, heat resistance or fuel resistance, but by maintaining the mixing ratio within the above range, large increases in the viscosity of the fire extinguishing composition concentrate can be avoided, and corresponding reductions in the commercial value of the composition can be prevented.

The fire extinguishing composition of the present invention displays superior solubility stability in both concentrated and diluted forms, and as such offers excellent extended storage. Furthermore, because of the superior solubility and low viscosity of the composition, a strong concentrate with a high dilution ratio can be easily manufactured. The kinematic viscosity of a concentrate with a 3% dilution ratio can be suppressed to a value of no more than 100 $mm^2/s$ at 20° C., which results in excellent handling properties. Furthermore, because the amount of the cationic polyamine based high molecular weight compound (A) added can be kept to a reasonably small amount, little deleterious effect is observed on the performance of the composition, and the freezing point of the fire extinguishing composition concentrate can be kept below −5° C.

According to the present invention, in order to improve the fire extinguishing performance against non-polar solvents such as petroleum, a suitable amount of a surfactant (D) with a cationic hydrophilic group may also be included in the composition with the aim of effectively lowering the surface tension and the interfacial tension with petroleum of the aqueous solution of the fire extinguishing composition.

There are no restrictions on the surfactant with a cationic hydrophilic group (D) provided the surfactant incorporates a cationic hydrophilic group. Examples of the cationic hydrophilic group of the surfactant with a cationic hydrophilic group (D) include pyridinium salts, quaternary ammonium salts, imidazaolinium salts, and benzalkonium salts. Of these cationic hydrophilic groups, pyridinium salts and quaternary ammonium salts are preferred from the viewpoint of compatibility, and quaternary ammonium salts are particularly desirable. Furthermore, examples of suitable counter ions for the cationic group include organic and inorganic anions.

Examples of the hydrophobic group of the surfactant (D) include aliphatic hydrocarbon groups of 6 or more carbon atoms, dihydrocarbyl siloxane chains, or fluorinated aliphatic groups of 3 to 20 carbon atoms and preferably 6 to 16 carbon atoms. Of these surfactants (D), surfactants with fluorinated aliphatic groups are particularly desirable as they offer improved fire extinguishing performance.

Examples of the surfactant with a cationic hydrophilic group (D) include compounds represented by the general formula (D-1):

(D-1)

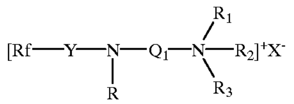

(In the formula, Rf represents a fluorinated aliphatic group of 3 to 20 carbon atoms which may also incorporate oxygen atoms, and Y represents a bivalent group such as $-(CH_2CH_2)_i-$, $-CH_2CH_2SCH_2COO-$, $-(CH_2CH_2)_i-SO_2-$, $-(CH_2CH_2)_i-CO-$,

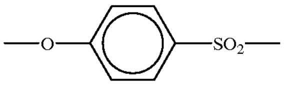

or

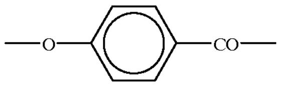

(where i represents an integer from 1 to 6). R represents a hydrogen atom or an aliphatic hydrocarbon group of 1 to 6 carbon atoms, and $Q_1$ represents an aliphatic hydrocarbon group, an aliphatic hydrocarbon group substituted with a hydroxyl group, an aromatic hydrocarbon group or a substituted aromatic hydrocarbon group, although a straight chain alkylene group of 1 to 6 carbon atoms is preferred. $R_1$ to $R_3$ can represent the same group or different groups, and each represent a hydrogen atom or an aliphatic hydrocarbon group of 1 to 6 carbon atoms, and $X^-$ represents an organic or an inorganic anion.)

In addition, a variety of additives may also be added to a fire extinguishing composition of the present invention. Such additives include additional foam stabilizers, freezing point depressants, rust prevention agents, and pH regulators and the like.

Additional foam stabilizers are mainly additives used for adjusting the expansion ratio or drainage, and suitable examples include non-ionic surfactants such as glycerin aliphatic esters, propylene glycol fatty acid esters, sorbitan fatty acid esters, polyoxyethylene sorbitol fatty acid esters, polyoxyethylene alkyl ethers, polyoxyethylene polyoxypropylene ethers, polyethylene glycol fatty acid esters, alkyl alkanol amides and alkyl polyglucosides; amphoteric surfactants such as betaine alkyl dimethylaminoacetate, alkyl dimethylamine oxides, alkyl carboxymethylhydroxyethyl imidazolium betaine, alkylamide propyl betaine, and alkylhydroxy sulfobetaine; as well as polyethylene glycol, polyvinyl alcohol, polyvinyl pyrrolidone, carboxymethyl cellulose, gum arabic, sodium alginate, polypropylene glycol and polyvinyl resin.

Examples of suitable freezing point depressants include ethylene glycol, propylene glycol, the cellosolve compounds (ethyl cellosolve and butyl cellosolve), caribtol compounds (ethyl carbitol, butyl carbitol, hexyl carbitol and octyl carbitol), lower alcohols (isopropyl alcohol, butanol, octanol), and urea.

Rust prevention agents and pH regulators can utilize any of the various commonly known compounds, and there are no particular restrictions.

As follows is a description of a method of using a fire extinguishing composition of the present invention.

The fire extinguishing composition of the present invention can be used as a fire extinguishing agent by using known methods for blowing in, or mixing, air, carbon dioxide, nitrogen, a low boiling point fluorocarbon such as difluorodicholoromethane, or another suitable non-flammable gas with the composition.

In other words, because the viscosity of the fire extinguishing composition concentrate of the present invention is comparatively low, a strong concentrate can be stored in a storage tank, and then at the time of use, normal methods can be used for introducing the composition into a water flow and adjusting the dilution ratio at some point before the mixture reaches a device such as a fire extinguishing apparatus or foam nozzle. Foam is then generated by blowing in, or mixing a non-flammable gas such as air, and the foam is discharged over the flame or sent under the surface of the flame. Alternatively, the composition can be prediluted to a usable concentration, and then used to fill devices such as fire extinguishers, parking lot fire extinguishing equipment, fixed fire extinguishing equipment for hazardous materials, or packaged fire extinguishing equipment.

Furthermore, examples of suitable methods for discharging the fire extinguishing composition of the present invention include the use of any of those discharge nozzles commonly used in the industry for delivering fire extinguishing compositions, and desired performance levels are able to be achieved.

Examples of suitable nozzles include the foam chamber and ISO standard compliant nozzle most widely used for petroleum tanks and the like, UL standard compliant nozzles, MIL standard compliant nozzles, hand nozzles attached to chemical fire engines and the like, air foam hand nozzles, SSI nozzles, the Japan Marine Standards Association specified HK nozzle, as well as foam heads used in driving lot fire extinguishing equipment, and spray heads and the like.

As described above, fire extinguishing compositions of the present invention can be used in a wide variety of discharge methods. Furthermore, a fire extinguishing composition of the present invention can also be applied to a wider range of fires than conventional fire extinguishing compositions. Specific examples of the use of the compositions of this invention include deployment on chemical fire engines and concentrate carrier vehicles employed by public fire fighting organizations, as well as deployment at petroleum sites or industrial sites with crude oil tanks or other hazardous material facilities, airport facilities, harbor facilities or shipping vessels involved in the loading of hazardous materials, gas stands, underground parking lots, buildings, tunnels and bridges. Furthermore, in addition to hazardous liquid material fires, the compositions can also be used on general fires such as timber fires in housing, or rubber and plastic fires such as tire fires.

In addition, because fire extinguishing compositions of the present invention display superior qualities of fuel resistance, flame resistance, heat resistance and foam forming properties, the strong concentrate or diluted aqueous solution can also be used for extinguishing cooking oil or salad oil fires by pouring directly onto the combustion surface to smother or cool the fire. Furthermore, a fire extinguishing composition of the present invention also displays superior stability of the diluted solution, and so the diluted solution can be used for filling spray cans and then used as simple household fire extinguishers.

Moreover, the foam generated from a fire extinguishing composition of the present invention is able to exist in a stable manner on aqueous solutions based on water, sol-gel type materials, sludge and pollutants, as well as various organic solvents and organic materials. Consequently, the volatilization of volatile materials from this wide range of materials can be suppressed, enabling the compositions of the present invention to also be used for preventing the ignition of flammable materials, and preventing the generation of odors.

Furthermore, the fire extinguishing compositions of the present invention may also be used in combination with powdered fire extinguishing compositions, protein based foam fire extinguishing compositions and synthetic interface foam fire extinguishing compositions comprising materials such as sodium bicarbonate, potassium bicarbonate, magnesium bicarbonate, ammonium sulfate, ammonium phosphate, and calcium carbonate.

EXAMPLES

As follows is a more detailed description of the present invention with reference to examples. In the following examples and comparative examples, all % values refer to weight percentage values.

Synthetic Example 1

In a stainless steel flask equipped with a thermometer, a nitrogen gas inlet tube, a stirrer, and a reflux condenser fitted with a dehydration tube, was placed 60 g of acetic acid, and 473 g of polyethyleneimine with a weight ratio between the primary amine, secondary amine, and tertiary amine groups of 39:45:16, and a dehydration reaction was then permitted to proceed under an atmosphere of nitrogen for 10 hours at a temperature of 180 to 240° C. Following completion of the reaction, ion exchange water was added to the reaction products to yield solid matter which was 50% by weight N-acylated polyethyleneimine (A-II-1) Analysis of the N-acylated polyethyleneimine (A-II-1) revealed that 10% of the total cationic groups had been acylated.

Synthetic Example 2

In a stainless steel flask equipped with a thermometer, a nitrogen gas inlet tube, a stirrer, and a reflux condenser fitted with a dehydration tube, was placed 60 g of acetic acid, and 473 g of polyethyleneimine with a weight ratio between the primary amine, secondary amine, and tertiary amine groups of 55:33:12, and a dehydration reaction was then permitted to proceed under an atmosphere of nitrogen for 10 hours at a temperature of 180 to 240° C. Following completion of the reaction, ion exchange water was added to the reaction products to yield solid matter which was 50% by weight N-acylated polyethyleneimine (A-II-2). Analysis of the N-acylated polyethyleneimine (A-II-2) revealed that 10% of the total cationic groups had been acylated.

Analysis Example

FIG. 1 is an NMR spectrum of a sample of a polyethyleneimine (A-I) representing the cationic polyamine based high molecular weight compound (A), which was measured using an EX-27 FT-NMR device manufactured by NEC Corporation, Ltd. The measurement conditions are listed below.

Solvent: $D_2O$

Measurement temperature: 28° C.

Measurement mode: COM

Nucleus observed: $^{13}C$

Illuminating nucleus: 1H (67.70 MHz)

Pulse width: 4.1 $\mu$s

The ratios between the primary amine, secondary amine and tertiary amine groups were calculated from the integral curve for the peaks A to G in FIG. 1, using the following formulae.

Amount of primary amine (a)=F+G

Amount of secondary amine (b)=(F+D/2+E)/2

Amount of tertiary amine (c)=(A+B+(C−F)/2)/3

Primary amine proportion (weight %)=a/(a+b+c)×100

Secondary amine proportion (weight %)=b/(a+b+c)×100

Tertiary amine proportion (weight %)=c/(a+b+c)×100

Table 1 shows the relative proportions of primary amine, secondary amine and tertiary amine groups measured by the above method for polyethyleneimine (A-I) samples representing the cationic polyamine based high molecular weight compound (A), including "EPOMIN P-1050" manufactured by Nippon Shokubai Co. Ltd. (hereafter abbreviated as (A-I-1)), "LUPASOL P" manufactured by BASF Corporation Ltd. of Germany (and hereafter abbreviated as (A-I-2)), N-acylated polyethyleneimine (A-II-1) and (A-II-2) produced by the synthetic example 1 and the synthetic example 2 respectively, as well as derivatives thereof.

TABLE 1

| Cationic polyamine based high molecular weight compound (A) | Primary amines | Secondary amines | Tertiary amines |
|---|---|---|---|
| A-I-1 | 38% by weight | 42% by weight | 20% by weight |
| A-I-2 | 44% by weight | 33% by weight | 23% by weight |
| A-II-1 | 35% by weight | 45% by weight | 20% by weight |
| A-II-2 | 50% by weight | 30% by weight | 20% by weight |

Examples 1 to 40

Composition

Cationic polyamine based high molecular weight compound (A) 6%

Surfactant with an anionic hydrophilic group (B) 3%

Polybasic acid compound (C) 4%

Butyl carbitol 15%

Ethylene glycol 15%

Water 57%

A cationic polyamine based high molecular weight compound (A), a surfactant with an anionic hydrophilic group (B), and a polybasic acid compound (C) as shown in table 2 and table 3 below, were mixed together in the proportions listed above, and a small amount of 5(N) hydrochloric acid was added to adjust the pH to 7.5. The external appearance, freezing point, kinematic viscosity as measured at −10° C., and the amount of sedimentation in a 3% solution diluted with water from the water supply, for the produced fire extinguishing compositions (3% concentrates), are shown in Table 2 and Table 3 in accordance with the technical specifications listed in the Ministry of Home Affairs Ordinance No. 26.

TABLE 2

| Example No. | (A) | (B) | (C) | External appearance | Freezing point | Kinematic viscosity | Sedimentation amount |
|---|---|---|---|---|---|---|---|
| Example 1 | A-I-1 | B-1-a | C-1 (n = 4) | totally transparent | −19° C. | 126 cst | trace |
| Example 2 | A-I-1 | B-1-m | C-1 (n = 4) | totally transparent | −18° C. | 133 cst | trace |
| Example 3 | A-I-1 | B-1-t | C-1 (n = 6) | totally transparent | −17° C. | 132 cst | trace |
| Example 4 | A-II-1 | B-1-e | C-2 | totally transparent | −17° C. | 100 cst | trace |
| Example 5 | A-II-1 | B-1-h | C-4 | totally transparent | −17° C. | 144 cst | trace |
| Example 6 | A-II-1 | B-1-n | C-3 | totally transparent | −18° C. | 122 cst | trace |
| Example 7 | A-II-1 | B-1-m | C-13 | totally transparent | −16° C. | 119 cst | trace |
| Example 8 | A-I-1 | B-1-u | C-16 | totally transparent | −19° C. | 136 cst | trace |
| Example 9 | A-I-1 | B-2-a | C-23 | totally transparent | −18° C. | 140 cst | trace |
| Example 10 | A-I-1 | B-2-c | C-1 (n = 4) | totally transparent | −18° C. | 97 cst | trace |
| Example 11 | A-I-1 | B-2-j | C-24 | totally transparent | −17° C. | 111 cst | trace |
| Example 12 | A-I-1 | B-2-o | C-31 (q = 2) | totally transparent | −20° C. | 125 cst | trace |
| Example 13 | A-II-1 | B-2-g | C-28 | totally transparent | −16° C. | 133 cst | trace |
| Example 14 | A-II-1 | B-2-c | C-1 (n = 6) | totally transparent | −18° C. | 124 cst | trace |
| Example 15 | A-II-1 | B-2-c | C-16 | totally transparent | −17° C. | 129 cst | trace |
| Example 16 | A-II-1 | B-2-k | C-10 | totally transparent | −17° C. | 130 cst | trace |
| Example 17 | A-I-1 | B-3-i | C-17 | totally transparent | −16° C. | 117 cst | trace |
| Example 18 | A-I-1 | B-3-d | C-7 | totally transparent | −16° C. | 140 cst | trace |
| Example 19 | A-I-1 | B-4-b | C-1 (n = 4) | totally transparent | −19° C. | 118 cst | trace |
| Example 20 | A-I-1 | B-4-e | C-14 | totally transparent | −18° C. | 123 cst | trace |

TABLE 3

| Example No. | (A) | (B) | (C) | External appearance | Freezing point | Kinematic viscosity | Sedimentation amount |
|---|---|---|---|---|---|---|---|
| Example 21 | A-I-1 | B-4-g | C-14 | totally transparent | −16° C. | 117 cst | trace |
| Example 22 | A-I-1 | B-5-c | C-1 (n = 2) | totally transparent | −17° C. | 134 cst | trace |
| Example 23 | A-I-1 | B-5-i | C-10 | totally transparent | −17° C. | 128 cst | trace |
| Example 24 | A-I-1 | B-6-d | D-1 (n = 4) | totally transparent | −18° C. | 139 cst | trace |
| Example 25 | A-I-1 | B-6-c | C-11 | totally transparent | −18° C. | 131 cst | trace |
| Example 26 | A-I-1 | B-6-b | C-28 | totally transparent | −19° C. | 113 cst | trace |
| Example 27 | A-II-1 | B-6-a | C-16 | totally transparent | −16° C. | 122 cst | trace |
| Example 28 | A-II-1 | B-6-f | C-22 | totally transparent | −20° C. | 137 cst | trace |
| Example 29 | A-II-1 | B-6-e | C-3 | totally transparent | −18° C. | 140 cst | trace |
| Example 30 | A-II-1 | B-6-a | C-26 | totally transparent | −17° C. | 117 cst | trace |
| Example 31 | A-II-1 | B-7-g | C-16 | totally transparent | −18° C. | 130 cst | trace |
| Example 32 | A-I-1 | B-7-k | C-18 | totally transparent | −16° C. | 109 cst | trace |
| Example 33 | A-I-1 | B-8-d | C-23 | totally transparent | −17° C. | 122 cst | trace |
| Example 34 | A-I-1 | B-8-e | C-24 | totally transparent | −18° C. | 150 cst | trace |
| Example 35 | A-I-1 | B-9-a | C-28 | totally transparent | −18° C. | 149 cst | trace |
| Example 36 | A-II-1 | B-9-e | C-31 | totally transparent | −17° C. | 128 cst | trace |
| Example 37 | A-I-1 | B-9-l | C-1 (n = 8) | totally transparent | −17° C. | 134 cst | trace |
| Example 38 | A-I-1 | B-9-a | C-1 (n = 4) | totally transparent | −16° C. | 133 cst | trace |
| Example 39 | A-I-1 | B-10-a | C-1 (n = 4) | totally transparent | −18° C. | 162 cst | trace |
| Example 40 | A-I-1 | B-10-b | C-10 | totally transparent | −19° C. | 169 cst | trace |

In addition, fire extinguishing experiments were conducted on a non-polar solvent (a solvent for which the solubility in 100 g of water at 20° C. is less than 1 g) based on the methods described in the Ministry of Home Affairs Ordinance No. 26, and the results of these experiments are shown in table 4, table 5, table 6 and table 7. Specifically, 200 L of n-heptane was used as fuel in a fire model with a combustion surface area of 4 $m^2$ (B-20 scale), and the precombustion period was set at 1 minute. The dilute solutions for use in the fire extinguishing experiments were generated by diluting the concentrated solutions shown in each of the examples with water by a factor of 33.3 times. Each dilute solution was then used for filling a pressurized tank with 100 liters of solution, and subsequent foam generation was carried out with a standard foam generation nozzle used for testing aqueous film forming foam fire extinguishing compositions (as per national certification), using a nitrogen pressure of 7 kg/$cm^2$, a discharge speed of 10 liters/minute, and a total discharge time of 5 minutes. The temperature of the dilute solution was adjusted to a value of 20° C.±2° C. in each case. Experiments were conducted on the time taken for a 90% coverage of the combustion surface area (90% control time) as an indication of the relative superiority of the foam expansion speed, and the time taken for complete fire extinguishing which represents the most salient measure of fire extinguishing speed. In addition, a vapor seal experiment which acts as an indication of reignition prevention, and a burn back experiment which acts as an indication of flame resistance were also performed.

TABLE 4

| | Diluting water used | Dilution ratio | Combustion solvent | 90% control time | Extinguishing time seconds | Vapor seal experiment | Burn back experiment |
|---|---|---|---|---|---|---|---|
| Example | fresh water | 3% | n-heptane | 30 seconds | 71 | no ignition | 5 $cm^2$ |
| 1 | sea water | 3% | n-heptane | 31 seconds | 86 | no ignition | 20 $cm^2$ |
| Example | fresh water | 3% | n-heptane | 30 seconds | 78 | no ignition | 10 $cm^2$ |
| 2 | sea water | 3% | n-heptane | 36 seconds | 84 | no ignition | 10 $cm^2$ |
| Example | fresh water | 3% | n-heptane | 33 seconds | 68 | no ignition | 6 $cm^2$ |
| 3 | sea water | 3% | n-heptane | 34 seconds | 80 | no ignition | 15 $cm^2$ |

TABLE 4-continued

| | Diluting water used | Dilution ratio | Combustion solvent | 90% control time | Extinguishing time seconds | Vapor seal experiment | Burn back experiment |
|---|---|---|---|---|---|---|---|
| Example | fresh water | 3% | n-heptane | 31 seconds | 73 | no ignition | 20 $cm^2$ |
| 4 | sea water | 3% | n-heptane | 36 seconds | 79 | no ignition | 30 $cm^2$ |
| Example | fresh water | 3% | n-heptane | 36 seconds | 80 | no ignition | 0 $cm^2$ |
| 5 | sea water | 3% | n-heptane | 33 seconds | 85 | no ignition | 0 $cm^2$ |
| Example | fresh water | 3% | n-heptane | 33 seconds | 73 | no ignition | 8 $cm^2$ |
| 6 | sea water | 3% | n-heptane | 37 seconds | 78 | no ignition | 11 $cm^2$ |
| Example | fresh water | 3% | n-heptane | 30 seconds | 69 | no ignition | 0 $cm^2$ |
| 7 | sea water | 3% | n-heptane | 32 seconds | 76 | no ignition | 20 $cm^2$ |
| Example | fresh water | 3% | n-heptane | 31 seconds | 72 | no ignition | 0 $cm^2$ |
| 8 | sea water | 3% | n-heptane | 31 seconds | 78 | no ignition | 0 $cm^2$ |
| Example | fresh water | 3% | n-heptane | 29 seconds | 67 | no ignition | 2 $cm^2$ |
| 9 | sea water | 3% | n-heptane | 28 seconds | 72 | no ignition | 3 $cm^2$ |
| Example | fresh water | 3% | n-heptane | 36 seconds | 80 | no ignition | 30 $cm^2$ |
| 10 | sea water | 3% | n-heptane | 34 seconds | 82 | no ignition | 35 $cm^2$ |
| Example | fresh water | 3% | n-heptane | 35 seconds | 79 | no ignition | 0 $cm^2$ |
| 11 | sea water | 3% | n-heptane | 36 seconds | 87 | no ignition | 0 $cm^2$ |
| Example | fresh water | 3% | n-heptane | 30 seconds | 84 | no ignition | 10 $cm^2$ |
| 12 | sea water | 3% | n-heptane | 33 seconds | 88 | no ignition | 20 $cm^2$ |

TABLE 5

| | Diluting water used | Dilution ratio | Combustion solvent | 90% control time | Extinguishing time seconds | Vapor seal experiment | Burn back experiment |
|---|---|---|---|---|---|---|---|
| Example | fresh water | 3% | n-heptane | 29 seconds | 73 | no ignition | 0 $cm^2$ |
| 13 | sea water | 3% | n-heptane | 28 seconds | 79 | no ignition | 0 $cm^2$ |
| Example | fresh water | 3% | n-heptane | 37 seconds | 86 | no ignition | 10 $cm^2$ |
| 14 | sea water | 3% | n-heptane | 35 seconds | 93 | no ignition | 0 $cm^2$ |
| Example | fresh water | 3% | n-heptane | 35 seconds | 77 | no ignition | 20 $cm^2$ |
| 15 | sea water | 3% | n-heptane | 34 seconds | 81 | no ignition | 30 $cm^2$ |
| Example | fresh water | 3% | n-heptane | 34 seconds | 82 | no ignition | 0 $cm^2$ |
| 16 | sea water | 3% | n-heptane | 35 seconds | 78 | no ignition | 0 $cm^2$ |
| Example | fresh water | 3% | n-heptane | 38 seconds | 90 | no ignition | 50 $cm^2$ |
| 17 | sea water | 3% | n-heptane | 39 seconds | 96 | no ignition | 10 $cm^2$ |
| Example | fresh water | 3% | n-heptane | 37 seconds | 87 | no ignition | 0 $cm^2$ |
| 18 | sea water | 3% | n-heptane | 38 seconds | 91 | no ignition | 0 $cm^2$ |
| Example | fresh water | 3% | n-heptane | 29 seconds | 71 | no ignition | 18 $cm^2$ |
| 19 | sea water | 3% | n-heptane | 29 seconds | 74 | no ignition | 31 $cm^2$ |
| Example | fresh water | 3% | n-heptane | 31 seconds | 75 | no ignition | 22 $cm^2$ |
| 20 | sea water | 3% | n-heptane | 33 seconds | 77 | no ignition | 0 $cm^2$ |
| Example | fresh water | 3% | n-heptane | 29 seconds | 70 | no ignition | 0 $cm^2$ |
| 21 | sea water | 3% | n-heptane | 28 seconds | 75 | no ignition | 0 $cm^2$ |
| Example | fresh water | 3% | n-heptane | 35 seconds | 88 | no ignition | 45 $cm^2$ |
| 22 | sea water | 3% | n-heptane | 36 seconds | 86 | no ignition | 30 $cm^2$ |
| Example | fresh water | 3% | n-heptane | 33 seconds | 90 | no ignition | 0 $cm^2$ |
| 23 | sea water | 3% | n-heptane | 34 seconds | 93 | no ignition | 10 $cm^2$ |
| Example | fresh water | 3% | n-heptane | 29 seconds | 75 | no ignition | 0 $cm^2$ |
| 24 | sea water | 3% | n-heptane | 28 seconds | 74 | no ignition | 0 $cm^2$ |

TABLE 6

| | Diluting water used | Dilution ratio | Combustion solvent | 90% control time | Extinguishing time seconds | Vapor seal experiment | Burn back experiment |
|---|---|---|---|---|---|---|---|
| Example | fresh water | 3% | n-heptane | 32 seconds | 76 | no ignition | 20 $cm^2$ |
| 25 | sea water | 3% | n-heptane | 31 seconds | 76 | no ignition | 30 $cm^2$ |
| Example | fresh water | 3% | n-heptane | 35 seconds | 82 | no ignition | 26 $cm^2$ |
| 26 | sea water | 3% | n-heptane | 36 seconds | 90 | no ignition | 12 $cm^2$ |
| Example | fresh water | 3% | n-heptane | 31 seconds | 71 | no ignition | 0 $cm^2$ |
| 27 | sea water | 3% | n-heptane | 29 seconds | 76 | no ignition | 0 $cm^2$ |
| Example | fresh water | 3% | n-heptane | 29 seconds | 74 | no ignition | 30 $cm^2$ |
| 28 | sea water | 3% | n-heptane | 28 seconds | 76 | no ignition | 35 $cm^2$ |
| Example | fresh water | 3% | n-heptane | 31 seconds | 82 | no ignition | 10 $cm^2$ |
| 29 | sea water | 3% | n-heptane | 33 seconds | 85 | no ignition | 0 $cm^2$ |
| Example | fresh water | 3% | n-heptane | 31 seconds | 81 | no ignition | 38 $cm^2$ |
| 30 | sea water | 3% | n-heptane | 30 seconds | 87 | no ignition | 25 $cm^2$ |
| Example | fresh water | 3% | n-heptane | 36 seconds | 95 | no ignition | 50 $cm^2$ |
| 31 | sea water | 3% | n-heptane | 38 seconds | 98 | no ignition | 60 $cm^2$ |

TABLE 6-continued

| | Diluting water used | Dilution ratio | Combustion solvent | 90% control time | Extinguishing time seconds | Vapor seal experiment | Burn back experiment |
|---|---|---|---|---|---|---|---|
| Example | fresh water | 3% | n-heptane | 37 seconds | 97 | no ignition | 5 $cm^2$ |
| 32 | sea water | 3% | n-heptane | 35 seconds | 93 | no ignition | 0 $cm^2$ |
| Example | fresh water | 3% | n-heptane | 36 seconds | 99 | no ignition | 0 $cm^2$ |
| 33 | sea water | 3% | n-heptane | 36 seconds | 91 | no ignition | 0 $cm^2$ |
| Example | fresh water | 3% | n-heptane | 31 seconds | 93 | no ignition | 14 $cm^2$ |
| 34 | sea water | 3% | n-heptane | 31 seconds | 92 | no ignition | 15 $cm^2$ |
| Example | fresh water | 3% | n-heptane | 30 seconds | 80 | no ignition | 10 $cm^2$ |
| 35 | sea water | 3% | n-heptane | 33 seconds | 83 | no ignition | 30 $cm^2$ |
| Example | fresh water | 3% | n-heptane | 31 seconds | 80 | no ignition | 20 $cm^2$ |
| 36 | sea water | 3% | n-heptane | 33 seconds | 79 | no ignition | 26 $cm^2$ |

TABLE 7

| | Diluting water used | Dilution ratio | Combustion solvent | 90% control time | Extinguishing time seconds | Vapor seal experiment | Burn back experiment |
|---|---|---|---|---|---|---|---|
| Example | fresh water | 3% | n-heptane | 29 seconds | 83 | no ignition | 50 $cm^2$ |
| 37 | sea water | 3% | n-heptane | 28 seconds | 85 | no ignition | 35 $cm^2$ |
| Example | fresh water | 3% | n-heptane | 33 seconds | 78 | no ignition | 48 $cm^2$ |
| 38 | sea water | 3% | n-heptane | 35 seconds | 76 | no ignition | 25 $cm^2$ |
| Example | fresh water | 3% | n-heptane | 40 seconds | 102 | no ignition | 50 $cm^2$ |
| 39 | sea water | 3% | n-heptane | 39 seconds | 99 | no ignition | 0 $cm^2$ |
| Example | fresh water | 3% | n-heptane | 38 seconds | 100 | no ignition | 60 $cm^2$ |
| 40 | sea water | 3% | n-heptane | 38 seconds | 103 | no ignition | 45 $cm^2$ |

Furthermore, fire extinguishing experiments were also conducted on a polar solvent (a solvent for which the solubility in 100 g of water at 20° C. is at least 1 g) based on the methods described in the Fire Fighting Hazards No. 71, and the results of these experiments are shown in table 8, table 9, table 10 and table 11. Specifically, 400 L of each solvent was used as fuel in a fire model with a combustion surface area of 4 $m^2$ (B-20 scale: coefficient 1), and the precombustion period was set at 1 minute. The dilute solutions for use in the fire extinguishing experiments were generated by diluting the concentrated solutions shown in each of the examples with water by a factor of 33.3 times. Each dilute solution was then used for filling a pressurized tank with 100 liters of solution, and subsequent foam generation was carried out with a standard foam generation nozzle used for testing aqueous film forming foam fire extinguishing compositions (as per national certification), using a nitrogen pressure of 7 kg/$cm^2$, a discharge speed of 10 liters/minute, and a total discharge time of 5 minutes. The temperature of the dilute solution was adjusted to a value of 20° C.±2° C. in each case. Experiments were conducted on the time taken for a 90% coverage of the combustion surface area (90% control time) as an indication of the relative superiority of the foam expansion speed (and also as a measure of the fuel resistance of the foam relative to the polar solvent), and the time taken for complete fire extinguishing which represents the most salient measure of fire extinguishing speed. In addition, a vapor seal experiment which acts as an indication of reignition prevention, and a burn back experiment which acts as an indication of flame resistance were also performed in the same manner as for the non-polar solvents described above.

TABLE 8

| Example No. | Diluting water used | Dilution ratio | Combustion solvent | Foam magnification (times) | 90% control time (seconds) | Extinguishing time (seconds) | Vapor seal experiment | Burn back experiment ($cm^2$) |
|---|---|---|---|---|---|---|---|---|
| Example | fresh water | 3% | 2-propanol | 6.2 | 42 | 111 | no ignition | 65 |
| 1 | sea water | 3% | 2-propanol | 6.4 | 44 | 112 | no ignition | 70 |
| Example | fresh water | 3% | 2-propanol | 6.3 | 45 | 115 | no ignition | 68 |
| 2 | sea water | 3% | 2-propanol | 6.3 | 46 | 113 | no ignition | 75 |
| Example | fresh water | 3% | methanol | 6.3 | 34 | 70 | no ignition | 10 |
| 3 | sea water | 3% | methanol | 6.3 | 38 | 65 | no ignition | 15 |
| Example | fresh water | 3% | acetone | 6.2 | 30 | 81 | no ignition | 45 |
| 4 | sea water | 3% | acetone | 6.2 | 30 | 85 | no ignition | 36 |
| Example | fresh water | 3% | acetone | 6.0 | 33 | 79 | no ignition | 33 |
| 5 | sea water | 3% | acetone | 6.0 | 33 | 77 | no ignition | 31 |
| Example 6 | fresh water | 3% | propylene oxide | 6.1 | 29 | 55 | no ignition | 20 |
| | sea water | 3% | propylene oxide | 6.1 | 27 | 54 | no ignition | 26 |
| Example | fresh water | 3% | 2-propanol | 6.3 | 41 | 111 | no ignition | 75 |
| 7 | sea water | 3% | 2-propanol | 6.4 | 45 | 108 | no ignition | 68 |

TABLE 8-continued

| Example No. | Diluting water used | Dilution ratio | Combustion solvent | Foam magnification (times) | 90% control time (seconds) | Extinguishing time (seconds) | Vapor seal experiment | Burn back experiment ($cm^2$) |
|---|---|---|---|---|---|---|---|---|
| Example | fresh water | 3% | acetone | 6.1 | 30 | 75 | no ignition | 20 |
| 8 | sea water | 3% | acetone | 6.3 | 29 | 81 | no ignition | 18 |
| Example | fresh water | 3% | methanol | 6.2 | 29 | 68 | no ignition | 14 |
| 9 | sea water | 3% | methanol | 6.3 | 28 | 62 | no ignition | 10 |
| Example | fresh water | 3% | methanol | 6.1 | 30 | 74 | no ignition | 20 |
| 10 | sea water | 3% | methanol | 6.1 | 31 | 72 | no ignition | 33 |

TABLE 9

| Example No. | Diluting water used | Dilution ratio | Combustion solvent | Foam magnification (times) | 90% control time (seconds) | Extinguishing time (seconds) | Vapor seal experiment | Burn back experiment ($cm^2$) |
|---|---|---|---|---|---|---|---|---|
| Example 11 | fresh water | 3% | acetone | 6.3 | 35 | 82 | no ignition | 36 |
| | seawater | 3% | acetone | 6.2 | 38 | 77 | no ignition | 17 |
| Example 12 | fresh water | 3% | methanol | 5.9 | 26 | 61 | no ignition | 5 |
| | sea water | 3% | methanol | 6.0 | 29 | 63 | no ignition | 14 |
| Example 13 | fresh water | 3% | propylene oxide | 6.4 | 26 | 57 | no ignition | 20 |
| | sea water | 3% | propylene oxide | 6.3 | 24 | 56 | no ignition | 26 |
| Example 14 | fresh water | 3% | 2-propanol | 6.2 | 39 | 119 | no ignition | 64 |
| | sea water | 3% | 2-propanol | 6.2 | 33 | 104 | no ignition | 62 |
| Example 15 | fresh water | 3% | acetone | 6.0 | 39 | 87 | no ignition | 40 |
| | sea water | 3% | acetone | 6.0 | 41 | 81 | no ignition | 39 |
| Example 16 | fresh water | 3% | acetone | 6.3 | 44 | 90 | no ignition | 24 |
| | sea water | 3% | acetone | 6.4 | 43 | 95 | no ignition | 27 |
| Example 17 | fresh water | 3% | acetone | 6.1 | 37 | 88 | no ignition | 75 |
| | sea water | 3% | acetone | 6.3 | 34 | 79 | no ignition | 66 |
| Example 18 | fresh water | 3% | 2-propanol | 5.8 | 45 | 131 | no ignition | 76 |
| | sea water | 3% | 2-propanol | 5.7 | 47 | 122 | no ignition | 80 |
| Example 19 | fresh water | 3% | acetone | 6.1 | 38 | 83 | no ignition | 33 |
| | sea water | 3% | acetone | 6.1 | 37 | 80 | no ignition | 44 |
| Example 20 | fresh water | 3% | propylene oxide | 6.1 | 24 | 61 | no ignition | 10 |
| | sea water | 3% | propylene oxide | 6.2 | 26 | 59 | no ignition | 11 |

TABLE 10

| Example No. | Diluting water used | Dilution ratio | Combustion solvent | Foam magnification (times) | 90% control time (seconds) | Extinguishing time (seconds) | Vapor seal experiment | Burn back experiment ($cm^2$) |
|---|---|---|---|---|---|---|---|---|
| Example 21 | fresh water | 3% | acetone | 5.9 | 31 | 94 | no ignition | 32 |
| | sea water | 3% | acetone | 6.0 | 35 | 98 | no ignition | 36 |
| Example 22 | fresh water | 3% | propylene oxide | 6.2 | 24 | 55 | no ignition | 20 |
| | sea water | 3% | propylene oxide | 6.2 | 23 | 54 | no ignition | 22 |
| Example 23 | fresh water | 3% | acetone | 6.1 | 29 | 82 | no ignition | 18 |
| | sea water | 3% | acetone | 6.1 | 28 | 80 | no ignition | 19 |
| Example 24 | fresh water | 3% | 2-propanol | 6.1 | 47 | 122 | no ignition | 55 |
| | sea water | 3% | 2-propanol | 6.0 | 44 | 126 | no ignition | 74 |
| Example 25 | fresh water | 3% | methanol | 6.3 | 25 | 59 | no ignition | 10 |
| | sea water | 3% | methanol | 6.2 | 24 | 57 | no ignition | 13 |
| Example 26 | fresh water | 3% | acetone | 6.0 | 30 | 86 | no ignition | 33 |
| | sea water | 3% | acetone | 6.0 | 29 | 83 | no ignition | 31 |
| Example 27 | fresh water | 3% | acetone | 6.1 | 32 | 85 | no ignition | 29 |
| | sea water | 3% | acetone | 6.1 | 33 | 86 | no ignition | 22 |
| Example 28 | fresh water | 3% | methanol | 6.2 | 22 | 58 | no ignition | 22 |
| | sea water | 3% | methanol | 6.2 | 23 | 56 | no ignition | 18 |
| Example 29 | fresh water | 3% | 2-propanol | 6.5 | 43 | 119 | no ignition | 80 |
| | sea water | 3% | 2-propanol | 6.3 | 46 | 112 | no ignition | 68 |
| Example 30 | fresh water | 3% | acetone | 6.0 | 26 | 91 | no ignition | 40 |
| | sea water | 3% | acetone | 6.0 | 24 | 98 | no ignition | 35 |

TABLE 11

| Example No. | Diluting water used | Dilution ratio | Combustion solvent | Foam magnification (times) | 90% control time (seconds) | Extinguishing time (seconds) | Vapor seal experiment | Burn back experiment ($cm^2$) |
|---|---|---|---|---|---|---|---|---|
| Example | fresh water | 3% | methanol | 5.7 | 24 | 89 | no ignition | 36 |
| 31 | sea water | 3% | methanol | 6.1 | 28 | 91 | no ignition | 17 |
| Example | fresh water | 3% | acetone | 6.2 | 27 | 89 | no ignition | 34 |
| 32 | sea water | 3% | acetone | 6.2 | 29 | 84 | no ignition | 44 |
| Example | fresh water | 3% | methanol | 6.0 | 27 | 91 | no ignition | 33 |
| 33 | sea water | 3% | methanol | 6.0 | 31 | 90 | no ignition | 32 |
| Example | fresh water | 3% | methanol | 5.9 | 23 | 64 | no ignition | 13 |
| 34 | sea water | 3% | methanol | 6.2 | 24 | 67 | no ignition | 15 |
| Example | fresh water | 3% | 2-propanol | 6.1 | 45 | 139 | no ignition | 77 |
| 35 | sea water | 3% | 2-propanol | 6.1 | 47 | 136 | no ignition | 69 |
| Example | fresh water | 3% | 2-propanol | 6.2 | 44 | 113 | no ignition | 77 |
| 36 | sea water | 3% | 2-propanol | 6.2 | 45 | 117 | no ignition | 61 |
| Example | fresh water | 3% | 2-propanol | 6.2 | 49 | 131 | no ignition | 76 |
| 37 | sea water | 3% | 2-propanol | 6.1 | 48 | 134 | no ignition | 71 |
| Example | fresh water | 3% | methanol | 6.5 | 21 | 61 | no ignition | 22 |
| 38 | sea water | 3% | methanol | 6.4 | 24 | 69 | no ignition | 23 |
| Example | fresh water | 3% | methanol | 6.3 | 26 | 76 | no ignition | 9 |
| 39 | sea water | 3% | methanol | 6.1 | 27 | 79 | no ignition | 6 |
| Example | fresh water | 3% | methanol | 6.0 | 33 | 85 | no ignition | 20 |
| 40 | sea water | 3% | methanol | 6.0 | 31 | 84 | no ignition | 35 |

Experimental Methods and Evaluation Standards

Foam Magnification

Foam generated from an experimental standard foam generation nozzle used for testing aqueous film forming foam fire extinguishing compositions (as per national certification) was used to fill a foam collection tank (volume V: 1400 ml, weight W1 g) as prescribed in the Ministry of Home Affairs Ordinance No. 26, and the total weight (W2 g) of the foam filled collection tank was measured. The foam magnification was then calculated using the formula below.

$$\text{Expansion ratio} = \frac{V}{W2 - W1}$$

90% Control Time

This value represents the time period from commencement of the foam discharge, until 90% of the combustion surface area of the fire model (combustion surface area 4 $m^2$: B-20 scale) was covered with foam.

Extinguishing Time

This value represents the time period from commencement of the foam discharge until the flames on the fire model had been completely extinguished.

Vapor Seal Experiment

On three occasions, namely 1 minute, 7 minutes and 11 minutes after the completion of the foam discharge, a torch was ignited and the flame brought close enough to touch the foam surface. The flame was then moved across the entire foam surface to observe whether or not the fuel would reignite.

Burn Back Experiment 15 minutes after the completion of the foam discharge, a 225 $cm^2$ hole was opened up in the center of the fire model, and the fuel thereunder was forcibly reignited. Five minutes after this ignition, the degree to which the combustion surface had expanded was evaluated.

Comparative Examples 1 to 21

For comparative purposes, fire extinguishing compositions (3% concentrates) were prepared using the same compositions and mixing methods as the examples described above, but with the exception that a polyethyleneimine or an N-propyl polyethyleneimine in which the amount of primary amine groups exceeds 40% and the amount of secondary amine groups is less than 35%, was used as the cationic polyamine based high molecular weight compound (A) of the present invention.

The compounds used for the cationic polyamine based high molecular weight compound (A), the surfactant with an anionic hydrophilic group (B) and the polybasic acid compound (C) are shown in table 12, together with the external appearance, freezing point, kinematic viscosity, and the amount of sedimentation in a 3% solution diluted with water from the water supply, for the produced fire extinguishing compositions (3% concentrates) carried out in accordance with the technical specifications listed in the Ministry of Home Affairs Ordinance No. 26.

In addition, fire extinguishing experiments were conducted for thixotropic water soluble high molecular weight material containing fire extinguishing compositions (incorporating a fluorine based surfactant, a commercially available product), and the results of the experiments for non-polar solvents are shown in table 13, table 14 and table 15, whereas the results of the experiments for polar solvents are shown in table 16, table 17 and table 18. In these tables the number in the right hand most column refers to the example corresponding with that particular comparative example.

TABLE 12

| Comparative Example No. | (A) | (B) | (C) | External appearance | Freezing point | Kinematic viscosity | Sedimentation amount |
|---|---|---|---|---|---|---|---|
| 1 | A-I-2 | B-i-a | C-1 (n = 4) | totally transparent | −19° C. | 126 cst | 0.5 v% |
| 2 | A-I-2 | B-I-t | C-1 (n = 6) | totally transparent | −17° C. | 132 cst | 0.5 v% |
| 3 | A-II-2 | B-1-h | C-4 | totally transparent | −17° C. | 144 cst | 0.3 v% |
| 4 | A-II-2 | B-i-m | C-13 | totally transparent | −16° C. | 119 cst | 0.4 v% |
| 5 | A-I-2 | B-2-a | C-23 | totally transparent | −18° C. | 140 cst | 0.5 v% |
| 6 | A-I-2 | B-2-j | C-24 | totally transparent | −17° C. | 111 cst | 0.6 v% |
| 7 | A-II-2 | B-2-g | C-28 | totally transparent | −16° C. | 133 cst | 0.3 v% |
| 8 | A-II-2 | B-2-c | C-16 | totally transparent | −17° C. | 129 cst | 0.2 v% |
| 9 | A-I-2 | B-3-i | C-17 | totally transparent | −16° C. | 117 cst | 0.5 v% |
| 10 | A-I-2 | B-4-b | C-1 (n = 4) | totally transparent | −19° C. | 118 cst | 0.5 v% |
| 11 | A-I-2 | B-4-g | C-14 | totally transparent | −16° C. | 117 cst | 0.5 v% |
| 12 | A-I-2 | B-S-i | C-10 | totally transparent | −17° C. | 128 cst | 0.4 v% |
| 13 | A-I-2 | B-6-c | C-11 | totally transparent | −18° C. | 131 cst | 0.5 v% |
| 14 | A-II-2 | B-6-a | C-16 | totally transparent | −16° C. | 122 cst | 0.5 v% |
| 15 | A-II-2 | B-6-e | C-3 | totally transparent | −18° C. | 140 cst | 0.4 v% |
| 16 | A-II-2 | B-7-g | C-16 | totally transparent | −18° C. | 130 cst | 0.3 v% |
| 17 | A-I-2 | B-8-d | C-23 | totally transparent | −17° C. | 122 cst | 0.5 v% |
| 18 | A-I-2 | B-9-a | C-28 | totally transparent | −18° C. | 149 cst | 0.5 v% |
| 19 | A-I-2 | B-9-l | C-1 (n = 8) | totally transparent | −17° C. | 134 cst | 0.4 v% |
| 20 | A-I-2 | B-10-b | C-1 (n = 4) | totally transparent | −18° C. | 162 cst | 0.5 v% |
| 21 | A-I-2 | B-10-b | C-10 | totally transparent | −19° C. | 169 cst | trace |

TABLE 13

| Comparative Example | Diluting water used | Dilution ratio | Combustion solvent | 90% control time (seconds) | Extinguishing time (seconds) | Vapor seal experiment | Burn back experiment ($cm^2$) | Corresponding Example |
|---|---|---|---|---|---|---|---|---|
| 1 | fresh water | 3% | n-heptane | 46 | 111 | no ignition | 100 | 1 |
| | sea water | 3% | n-heptane | 50 | 127 | no ignition | 97 | |
| 2 | fresh water | 3% | n-heptane | 44 | 119 | no ignition | 50 | 3 |
| | sea water | 3% | n-heptane | 45 | 135 | no ignition | 120 | |
| 3 | fresh water | 3% | n-heptane | 50 | 131 | no ignition | 100 | 5 |
| | sea water | 3% | n-heptane | 48 | 133 | no ignition | 122 | |
| 4 | fresh water | 3% | n-heptane | 41 | 108 | no ignition | 90 | 7 |
| | sea water | 3% | n-heptane | 43 | 125 | no ignition | 80 | |
| 5 | fresh water | 3% | n-heptane | 39 | 150 | no ignition | 90 | 9 |
| | sea water | 3% | n-heptane | 44 | 177 | no ignition | 154 | |
| 6 | fresh water | 3% | n-heptane | 50 | 164 | no ignition | 99 | 11 |
| | sea water | 3% | n-heptane | 47 | 172 | no ignition | 112 | |
| 7 | fresh water | 3% | n-heptane | 45 | 156 | no ignition | 130 | 13 |
| | sea water | 3% | n-heptane | 43 | 168 | no ignition | 140 | |

TABLE 14

| Comparative Example | Diluting water used | Dilution ratio | Combustion solvent | 90% control time (seconds) | Extinguishing time (seconds) | Vapor seal experiment | Burn back experiment ($cm^2$) | Corresponding Example |
|---|---|---|---|---|---|---|---|---|
| 8 | fresh water | 3% | n-heptane | 42 | 129 | no ignition | 100 | 15 |
| | sea water | 3% | n-heptane | 44 | 146 | no ignition | 122 | |

TABLE 14-continued

| Comparative Example | Diluting water used | Dilution ratio | Combustion solvent | 90% control time (seconds) | Extinguishing time (seconds) | Vapor seal experiment | Burn back experiment ($cm^2$) | Corresponding Example |
|---|---|---|---|---|---|---|---|---|
| 9 | fresh water | 3% | n-heptane | 53 | 153 | no ignition | 166 | 17 |
| | sea water | 3% | n-heptane | 55 | 176 | no ignition | 177 | |
| 10 | fresh water | 3% | n-heptane | 38 | 131 | no ignition | 188 | 19 |
| | sea water | 3% | n-heptane | 40 | 148 | no ignition | 130 | |
| 11 | fresh water | 3% | n-heptane | 42 | 120 | no ignition | 98 | 21 |
| | sea water | 3% | n-heptane | 41 | 125 | no ignition | 70 | |
| 12 | fresh water | 3% | n-heptane | 42 | 142 | no ignition | 120 | 23 |
| | sea water | 3% | n-heptane | 45 | 144 | no ignition | 129 | |
| 13 | fresh water | 3% | n-heptane | 37 | 114 | no ignition | 189 | 25 |
| | sea water | 3% | n-heptane | 38 | 115 | no ignition | 150 | |
| 14 | fresh water | 3% | n-heptane | 46 | 164 | no ignition | 123 | 27 |
| | sea water | 3% | n-heptane | 48 | 152 | no ignition | 144 | |

TABLE 15

| Comparative Example | Diluting water used | Dilution ratio | Combustion solvent | 90% control time (seconds) | Extinguishing time (seconds) | Vapor seal experiment | Burn back experiment ($cm^2$) | Corresponding Example |
|---|---|---|---|---|---|---|---|---|
| 15 | fresh water | 3% | n-heptane | 43 | 153 | no ignition | 118 | 29 |
| | sea water | 3% | n-heptane | 42 | 160 | no ignition | 150 | |
| 16 | fresh water | 3% | n-heptane | 49 | 180 | no ignition | 200 | 31 |
| | sea water | 3% | n-heptane | 46 | 197 | no ignition | 120 | |
| 17 | fresh water | 3% | n-heptane | 43 | 142 | no ignition | 120 | 33 |
| | sea water | 3% | n-heptane | 48 | 157 | no ignition | 102 | |
| 18 | fresh water | 3% | n-heptane | 45 | 141 | no ignition | 111 | 35 |
| | sea water | 3% | n-heptane | 47 | 149 | no ignition | 122 | |
| 19 | fresh water | 3% | n-heptane | 39 | 163 | no ignition | 167 | 37 |
| | sea water | 3% | n-heptane | 40 | 174 | no i nition | 155 | |
| 20 | fresh water | 3% | n-heptane | 59 | 181 | no ignition | 180 | 39 |
| | sea water | 3% | n-heptane | 53 | 191 | no ignition | 168 | |
| 21 | fresh water | 3% | n-heptane | 71 | 253 | no ignition | 235 | |
| | sea water | 3% | n-heptane | 77 | 283 | no ignition | 250 | |

TABLE 16

| Comparative Example | Diluting water used | Dilution ratio % | Combustion solvent | Foam magnification (times) | 90% control time (seconds) | Extinguishing time (seconds) | Vapor seal experiment | Burn back experiment ($cm^2$) | Corresponding Example |
|---|---|---|---|---|---|---|---|---|---|
| 1 | fresh water | 3% | 2-propanol | 6.3 | 56 | 171 | no ignition | 211 | 1 |
| | sea water | 3% | 2-propanol | 6.1 | 59 | 187 | no ignition | 153 | |
| 2 | fresh water | 3% | methanol | 6.2 | 45 | 114 | no ignition | 95 | 3 |
| | sea water | 3% | methanol | 6.3 | 44 | 118 | no ignition | 75 | |
| 3 | fresh water | 3% | acetone | 5.9 | 50 | 137 | no ignition | 100 | 5 |
| | sea water | 3% | acetone | 6.1 | 51 | 142 | no ignition | 90 | |
| 4 | fresh water | 3% | 2-propanol | 6.2 | 66 | 205 | no ignition | 185 | 7 |
| | sea water | 3% | 2-propanol | 6.2 | 70 | 194 | no ignition | 154 | |
| 5 | fresh water | 3% | methanol | 6.2 | 47 | 135 | no ignition | 99 | 9 |
| | sea water | 3% | methanol | 6.3 | 46 | 123 | no ignition | 77 | |
| 6 | fresh water | 3% | acetone | 6.3 | 52 | 143 | no ignition | 112 | 11 |
| | sea water | 3% | acetone | 6.3 | 51 | 133 | no ignition | 123 | |
| 7 | fresh water | 3% | propylene oxide | 6.3 | 41 | 126 | no ignition | 95 | 13 |
| | sea water | 3% | propylene oxide | 6.3 | 42 | 127 | no ignition | 90 | |

TABLE 17

| Comparative Example | Diluting water used | Dilution ratio % | Combustion solvent | Foam magnification (times) | 90% control time (seconds) | Extinguishing time (seconds) | Vapor seal experiment | Burn back experiment ($cm^2$) | Corresponding Example |
|---|---|---|---|---|---|---|---|---|---|
| 8 | fresh water | 3% | acetone | 6.1 | 50 | 142 | no ignition | 123 | 15 |
| | sea water | 3% | acetone | 6.2 | 49 | 163 | no ignition | 115 | |

TABLE 17-continued

| Comparative Example | Diluting water used | Dilution ratio % | Combustion solvent | Foam magnification (times) | 90% control time (seconds) | Extinguishing time (seconds) | Vapor seal experiment | Burn back experiment ($cm^2$) | Corresponding Example |
|---|---|---|---|---|---|---|---|---|---|
| 9 | fresh water | 3% | acetone | 6.0 | 49 | 178 | no ignition | 203 | 17 |
| | sea water | 3% | acetone | 6.1 | 50 | 193 | no ignition | 177 | |
| 10 | fresh water | 3% | acetone | 6.0 | 51 | 135 | no ignition | 180 | 19 |
| | sea water | 3% | acetone | 6.1 | 52 | 131 | no ignition | 175 | |
| 11 | fresh water | 3% | acetone | 6.1 | 46 | 142 | no ignition | 235 | 21 |
| | sea water | 3% | acetone | 6.0 | 48 | 139 | no ignition | 201 | |
| 12 | fresh water | 3% | acetone | 6.0 | 44 | 141 | no ignition | 154 | 23 |
| | sea water | 3% | acetone | 6.0 | 43 | 164 | no ignition | 132 | |
| 13 | fresh water | 3% | methanol | 6.2 | 40 | 106 | no ignition | 94 | 25 |
| | sea water | 3% | methanol | 6.1 | 41 | 115 | no ignition | 88 | |
| 14 | fresh water | 3% | acetone | 6.0 | 45 | 139 | no ignition | 120 | 27 |
| | sea water | 3% | acetone | 6.0 | 43 | 135 | no ignition | 116 | |

TABLE 18

| Comparative Example | Diluting water used | Dilution ratio % | Combustion solvent | Foam magnification (times) | 90% control time (seconds) | Extinguishing time (seconds) | Vapor seal experiment | Burn back experiment ($cm^2$) | Corresponding Example |
|---|---|---|---|---|---|---|---|---|---|
| 15 | fresh water | 3% | 2-propanol | 6.3 | 53 | 181 | no ignition | 200 | 29 |
| | sea water | 3% | 2-propanol | 6.3 | 57 | 170 | no ignition | 185 | |
| 16 | fresh water | 3% | methanol | 5.9 | 40 | 200 | no ignition | 160 | 31 |
| | sea water | 3% | methanol | 6.0 | 39 | 216 | no ignition | 144 | |
| 17 | fresh water | 3% | methanol | 5.9 | 41 | 149 | no ignition | 120 | 33 |
| | sea water | 3% | methanol | 6.0 | 43 | 146 | no ignition | 109 | |
| 18 | fresh water | 3% | 2-propanol | 6.1 | 61 | 202 | no ignition | 277 | 35 |
| | sea water | 3% | 2-propanol | 6.0 | 58 | 200 | no ignition | 255 | |
| 19 | fresh water | 3% | 2-propanol | 6.3 | 58 | 180 | no ignition | 188 | 37 |
| | sea water | 3% | 2-propanol | 6.3 | 55 | 131 | no ignition | 164 | |
| 20 | fresh water | 3% | acetone | 6.2 | 37 | 174 | no ignition | 70 | 39 |
| | sea water | 3% | acetone | 6.2 | 37 | 169 | no ignition | 65 | |
| 21 | fresh water | 3% | 2-propanol | 6.2 | 80 | * | not performed | — | |
| | sea water | 3% | 2-propanol | 6.0 | 78 | * | not performed | — | |

*means the fire was not extinguished.

What is claimed is:

1. A fire extinguishing composition comprising a cationic polyamine based high molecular weight compound (A) which incorporates primary, secondary, and tertiary cationic groups within each molecule and wherein said primary cationic groups account for no more than 40% by weight of all cationic groups; and further comprising a polybasic acid compound (C).

2. A fire extinguishing composition according to claim 1 further comprising a surfactant with an anionic hydrophilic group (B).

3. A fire extinguishing composition according to claim 1, wherein secondary cationic groups in said cationic polyamine based high molecular weight compound (A) account for at least 35% by weight of all cationic groups.

4. A fire extinguishing composition according to claim 1, wherein said cationic polyamine based high molecular weight compound (A) is polyethyleneimine or a derivative thereof.

5. A fire extinguishing composition according to claim 1, wherein said polybasic acid compound (C) is a dibasic acid compound of 4 to 18 carbon atoms.

6. A fire extinguishing composition according to claim 2, wherein said surfactant with an anionic hydrophilic group (B) is a fluorine-based surfactant with a fluorinated aliphatic group of 3 to 20 carbon atoms as a hydrophobic group.

7. An apparatus for fighting fires, comprising a container comprising fire extinguishing composition, and a nozzle adapted for ejecting said composition from said container; wherein said composition comprises a cationic polyamine based high molecular weight compound (A) which incorporates primary, secondary, and tertiary cationic groups within each molecule and wherein said primary cationic groups account for no more than 40% by weight of all cationic groups.

8. The apparatus of claim 7, wherein said composition further comprises a surfactant with an anionic hydrophilic group (B).

9. The apparatus of claim 7, wherein said composition further comprises a polybasic acid compound (C).

10. The apparatus of claim 7, wherein secondary cationic groups in said cationic polyamine based high molecular weight compound (A) account for at least 35% by weight of all cationic groups.

11. The apparatus of claim 7, wherein said cationic polyamine based high molecular weight compound (A) is polyethyleneimine or a derivative thereof.

12. The apparatus of claim 9, wherein said polybasic acid compound (C) is a dibasic acid compound of 4 to 18 carbon atoms.

13. The apparatus of claim 8, wherein said surfactant is a fluorine based surfactant with a fluorinated aliphatic group of 3 to 20 carbon atoms.

14. A method for extinguishing fire, comprising the steps of:

providing a fire extinguishing composition comprising a cationic polyamine based high molecular weight compound (A) which incorporates primary, secondary, and tertiary cationic groups within each molecule and wherein said primary cationic groups account for no more than 40% by weight of all cationic groups; and applying the composition to a fire.

15. The method for extinguishing fire according to claim 14 wherein said composition further comprises a surfactant with an anionic hydrophilic group (B).

16. The method for extinguishing fire according to claim 14 wherein said composition further comprises a polybasic acid compound (C).

17. The method for extinguishing fire according to claim 14 wherein secondary cationic groups in said cationic polyamine based high molecular weight compound (A) account for at least 35% by weight of all cationic groups.

18. The method for extinguishing fire according to claim 14 wherein said cationic polyamine based high molecular weight compound (A) is polyethyleneimine or a derivative thereof.

19. A fire extinguishing composition according to claim 16, wherein said polybasic acid compound (C) is a dibasic acid compound of 4 to 18 carbon atoms.

20. The method for extinguishing fire according to claim 15 wherein said surfactant is a fluorine based surfactant with a fluorinated aliphatic group of 3 to 20 carbon atoms.

* * * * *